United States Patent
Wiklund et al.

(10) Patent No.: US 7,949,495 B2
(45) Date of Patent: May 24, 2011

(54) PROCESS VARIABLE TRANSMITTER WITH DIAGNOSTICS

(75) Inventors: David E. Wiklund, Eden Prairie, MN (US); Kadir Kavaklioglu, Istanbul (TR); John P. Miller, Eden Prairie, MN (US); Ross C. Lamothe, Eden Prairie, MN (US); Evren Eryurek, Edina, MN (US)

(73) Assignee: Rosemount, Inc., Eden Prairie, MN (US)

( * ) Notice: Subject to any disclaimer, the term of this patent is extended or adjusted under 35 U.S.C. 154(b) by 225 days.

(21) Appl. No.: 11/205,745

(22) Filed: Aug. 17, 2005

(65) Prior Publication Data

US 2006/0036404 A1    Feb. 16, 2006

Related U.S. Application Data

(63) Continuation-in-part of application No. 10/801,073, filed on Mar. 15, 2004, now Pat. No. 7,254,518, which is a continuation-in-part of application No. 09/852,102, filed on May 9, 2001, now Pat. No. 6,907,383, which is a continuation-in-part of application No. 09/257,896, filed on Feb. 25, 1999, now abandoned, which is a continuation-in-part of application No. 08/623,569, filed on Mar. 28, 1996, now Pat. No. 6,017,143, said application No. 09/852,102 is a continuation-in-part of application No. 09/383,828, filed on Aug. 27, 1999, now Pat. No. 6,654,697, which is a continuation-in-part of application No. 09/257,896, which is a continuation-in-part of application No. 08/623,569.

(51) Int. Cl.
*G06F 11/30* (2006.01)
*G21C 17/00* (2006.01)
*G01R 23/16* (2006.01)

(52) U.S. Cl. .......................................... 702/183; 702/77
(58) Field of Classification Search .......... 702/182–185, 702/58, 59, 75–77, 110, 124, 125; 324/500, 324/512, 527; 700/108–110
See application file for complete search history.

(56) References Cited

U.S. PATENT DOCUMENTS 3,096,434 A    7/1963  King ............................ 235/151
(Continued)

FOREIGN PATENT DOCUMENTS
CA           999950         11/1976
(Continued)

OTHER PUBLICATIONS

International Search Report and Written Opinion from foreign application No. PCT/US2006/027541, filed Jul. 14, 2006.

(Continued)

*Primary Examiner* — Michael P Nghiem
(74) *Attorney, Agent, or Firm* — Christopher R. Christenson; Westman, Champlin & Kelly, P.A.

(57) ABSTRACT

A process variable transmitter with diagnostics based on power spectral density (PSD) analysis of a process variable sensor signal is provided. In one embodiment, the process variable transmitter is a pressure transmitter and the diagnostics are used to diagnose impulse line obstruction or impending obstruction. Other diagnostics are also useful such as diagnosing primary element degradation. The sensor signal is digitized and the digitized signal is transferred into the frequency domain. The power of the frequencies on the sensor signal is examined to provide the enhanced diagnostics. In one aspect diagnostics are generated directly with the sensor PSD data. In another aspect, the PSD analysis is used to tune a filter in order to enhance traditional diagnostic algorithms.

6 Claims, 12 Drawing Sheets

U.S. PATENT DOCUMENTS

| | | | | |
|---|---|---|---|---|
| 3,404,264 A | 10/1968 | Kugler ........................ 235/194 |
| 3,468,164 A | 9/1969 | Sutherland ...................... 73/343 |
| 3,590,370 A | 6/1971 | Fleischer ........................ 324/51 |
| 3,618,592 A | 11/1971 | Stewart ................... 128/2.05 R |
| 3,688,190 A | 8/1972 | Blum ........................ 324/61 R |
| 3,691,842 A | 9/1972 | Akeley ...................... 73/398 C |
| 3,701,280 A | 10/1972 | Stroman ........................ 73/194 |
| 3,849,637 A | 11/1974 | Caruso et al. .................. 235/151 |
| 3,855,858 A | 12/1974 | Cushing ................. 73/194 EM |
| 3,948,098 A | 4/1976 | Richardson et al. ........ 73/861.24 |
| 3,952,759 A | 4/1976 | Ottenstein ........................ 137/12 |
| 3,973,184 A | 8/1976 | Raber ............................ 324/51 |
| RE29,383 E | 9/1977 | Gallatin et al. ................. 137/14 |
| 4,058,975 A | 11/1977 | Gilbert et al. .................. 60/39.28 |
| 4,099,413 A | 7/1978 | Ohte et al. ........................ 73/359 |
| 4,102,199 A | 7/1978 | Talpouras ........................ 73/362 |
| 4,122,719 A | 10/1978 | Carlson et al. .................. 73/342 |
| 4,249,164 A | 2/1981 | Tivy ........................... 340/870.3 |
| 4,250,490 A | 2/1981 | Dahlke ..................... 340/870.37 |
| 4,279,013 A | 7/1981 | Cameron et al. .......... 340/870.37 |
| 4,337,516 A | 6/1982 | Murphy et al. ................ 364/551 |
| 4,399,824 A | 8/1983 | Davidson ...................... 128/736 |
| 4,417,312 A | 11/1983 | Cronin et al. .................. 364/510 |
| 4,459,858 A | 7/1984 | Marsh ........................ 73/861.12 |
| 4,463,612 A | 8/1984 | Thompson ................. 73/861.22 |
| 4,517,468 A | 5/1985 | Kemper et al. .................. 290/52 |
| 4,528,869 A | 7/1985 | Kubo et al. ........................ 74/695 |
| 4,530,234 A | 7/1985 | Cullick et al. .................... 73/53 |
| 4,536,753 A | 8/1985 | Parker .......................... 340/566 |
| 4,540,468 A | 9/1985 | Genco et al. .................... 162/49 |
| 4,571,689 A | 2/1986 | Hildebrand et al. ........... 364/481 |
| 4,630,265 A | 12/1986 | Sexton .......................... 370/85 |
| 4,635,214 A | 1/1987 | Kasai et al. .................... 364/551 |
| 4,642,782 A | 2/1987 | Kemper et al. ................. 364/550 |
| 4,644,479 A | 2/1987 | Kemper et al. ................. 364/550 |
| 4,649,515 A | 3/1987 | Thompson et al. ............ 364/900 |
| 4,668,473 A | 5/1987 | Agarwal ........................ 422/62 |
| 4,686,638 A | 8/1987 | Furuse ........................... 364/558 |
| 4,707,796 A | 11/1987 | Calabro et al. ................. 364/552 |
| 4,720,806 A | 1/1988 | Schippers et al. .............. 364/551 |
| 4,736,367 A | 4/1988 | Wroblewski et al. ........... 370/85 |
| 4,736,763 A | 4/1988 | Britton et al. .................... 137/10 |
| 4,758,308 A | 7/1988 | Carr .............................. 162/263 |
| 4,777,585 A | 10/1988 | Kokawa et al. ................. 364/164 |
| 4,807,151 A | 2/1989 | Citron ............................ 364/510 |
| 4,818,994 A | 4/1989 | Orth et al. ..................... 340/501 |
| 4,831,564 A | 5/1989 | Suga .......................... 364/551.01 |
| 4,841,286 A | 6/1989 | Kummer ........................ 340/653 |
| 4,853,693 A | 8/1989 | Eaton-Williams ............ 340/588 |
| 4,873,655 A | 10/1989 | Kondraske ..................... 364/553 |
| 4,907,167 A | 3/1990 | Skeirik ........................... 364/500 |
| 4,924,418 A | 5/1990 | Backman et al. ............... 364/550 |
| 4,926,364 A | 5/1990 | Brotherton ................... 364/581 |
| 4,934,196 A | 6/1990 | Romano ..................... 73/861.38 |
| 4,939,753 A | 7/1990 | Olson ............................ 375/107 |
| 4,964,125 A | 10/1990 | Kim ............................ 371/15.1 |
| 4,988,990 A | 1/1991 | Warrior ........................ 340/25.5 |
| 4,992,965 A | 2/1991 | Holter et al. .............. 364/551.01 |
| 5,005,142 A | 4/1991 | Lipchak et al. ................. 364/550 |
| 5,019,760 A | 5/1991 | Chu et al. ....................... 318/490 |
| 5,025,344 A | 6/1991 | Maly et al. ....................... 361/88 |
| 5,043,862 A | 8/1991 | Takahashi et al. .............. 364/162 |
| 5,053,815 A | 10/1991 | Wendell ....................... 355/208 |
| 5,057,774 A | 10/1991 | Verhelst et al. ................. 324/537 |
| 5,067,099 A | 11/1991 | McCown et al. ............... 364/550 |
| 5,081,598 A | 1/1992 | Bellows et al. ................. 364/550 |
| 5,083,091 A | 1/1992 | Frick et al. ..................... 324/678 |
| 5,089,979 A | 2/1992 | McEachern et al. ...... 364/571.04 |
| 5,089,984 A | 2/1992 | Struger et al. .................. 395/650 |
| 5,098,197 A | 3/1992 | Shepard et al. ................. 374/120 |
| 5,099,436 A | 3/1992 | McCown et al. ............... 364/550 |
| 5,103,409 A | 4/1992 | Shimizu et al. ................. 364/556 |
| 5,111,531 A | 5/1992 | Grayson et al. ................. 395/23 |
| 5,121,467 A | 6/1992 | Skeirik ............................ 395/11 |
| 5,122,794 A | 6/1992 | Warrior ...................... 340/825.2 |
| 5,122,976 A | 6/1992 | Bellows et al. ................. 364/550 |
| 5,130,936 A | 7/1992 | Sheppard et al. .......... 364/551.01 |
| 5,134,574 A | 7/1992 | Beaverstock et al. ..... 364/551.01 |
| 5,137,370 A | 8/1992 | McCullock et al. ........... 374/173 |
| 5,142,612 A | 8/1992 | Skeirik ............................ 395/11 |
| 5,143,452 A | 9/1992 | Maxedon et al. .............. 374/170 |
| 5,148,378 A | 9/1992 | Shibayama et al. ...... 364/551.07 |
| 5,150,289 A | 9/1992 | Badavas ........................ 364/154 |
| 5,167,009 A | 11/1992 | Skeirik ............................ 395/27 |
| 5,175,678 A | 12/1992 | Frerichs et al. ................. 364/148 |
| 5,193,143 A | 3/1993 | Kaemmerer et al. ............ 395/51 |
| 5,197,114 A | 3/1993 | Skeirik ............................ 395/22 |
| 5,197,328 A | 3/1993 | Fitzgerald ...................... 73/168 |
| 5,212,765 A | 5/1993 | Skeirik ............................ 395/11 |
| 5,214,582 A | 5/1993 | Gray .......................... 364/424.03 |
| 5,216,226 A | 6/1993 | Miyoshi ......................... 219/497 |
| 5,224,203 A | 6/1993 | Skeirik ............................ 395/22 |
| 5,228,780 A | 7/1993 | Shepard et al. ................. 374/175 |
| 5,235,527 A | 8/1993 | Ogawa et al. ............. 364/571.05 |
| 5,265,031 A | 11/1993 | Malczewski ................... 364/497 |
| 5,265,222 A | 11/1993 | Nishiya et al. ...................... 395/3 |
| 5,269,311 A | 12/1993 | Kirchner et al. ............... 128/672 |
| 5,274,572 A | 12/1993 | O'Neill et al. .................. 364/550 |
| 5,282,131 A | 1/1994 | Rudd et al. ..................... 364/164 |
| 5,282,261 A | 1/1994 | Skeirik ............................ 395/22 |
| 5,293,585 A | 3/1994 | Morita ............................ 395/52 |
| 5,303,181 A | 4/1994 | Stockton ........................ 365/96 |
| 5,305,230 A | 4/1994 | Matsumoto et al. ............ 364/495 |
| 5,311,421 A | 5/1994 | Nomura et al. ................. 364/157 |
| 5,317,520 A | 5/1994 | Castle ............................ 364/482 |
| 5,327,357 A | 7/1994 | Feinstein et al. ............... 364/502 |
| 5,333,240 A | 7/1994 | Matsumoto et al. ............. 395/23 |
| 5,340,271 A | 8/1994 | Freeman et al. .................... 415/1 |
| 5,347,843 A | 9/1994 | Orr et al. ............................. 73/3 |
| 5,349,541 A | 9/1994 | Alexandro, Jr. et al. ....... 364/578 |
| 5,357,449 A | 10/1994 | Oh ........................... 364/551.01 |
| 5,361,628 A | 11/1994 | Marko et al. .................... 73/116 |
| 5,365,423 A | 11/1994 | Chand .......................... 364/140 |
| 5,365,787 A | 11/1994 | Hernandez et al. ............. 73/660 |
| 5,367,612 A | 11/1994 | Bozich et al. ................... 395/22 |
| 5,384,699 A | 1/1995 | Levy et al. ............... 364/413.13 |
| 5,386,373 A | 1/1995 | Keeler et al. ................... 364/577 |
| 5,388,465 A | 2/1995 | Okaniwa et al. ............ 73/861.17 |
| 5,392,293 A | 2/1995 | Hsue ............................ 324/765 |
| 5,394,341 A | 2/1995 | Kepner ...................... 364/551.01 |
| 5,394,543 A | 2/1995 | Hill et al. ....................... 395/575 |
| 5,404,064 A | 4/1995 | Mermelstein et al. ......... 310/319 |
| 5,408,406 A | 4/1995 | Mathur et al. .................. 364/163 |
| 5,408,586 A | 4/1995 | Skeirik ............................ 395/23 |
| 5,410,495 A | 4/1995 | Ramamurthi ............. 364/511.05 |
| 5,414,645 A | 5/1995 | Hirano ...................... 364/551.01 |
| 5,419,197 A | 5/1995 | Ogi et al. ......................... 73/659 |
| 5,430,642 A | 7/1995 | Nakajima et al. .............. 364/148 |
| 5,434,774 A | 7/1995 | Seberger ........................ 364/172 |
| 5,436,705 A | 7/1995 | Raj ................................ 355/246 |
| 5,440,478 A | 8/1995 | Fisher et al. .................... 364/188 |
| 5,442,639 A | 8/1995 | Crowder et al. ............... 371/20.1 |
| 5,467,355 A | 11/1995 | Umeda et al. ............. 364/571.04 |
| 5,469,070 A | 11/1995 | Koluvek ........................ 324/713 |
| 5,469,156 A | 11/1995 | Kogura ..................... 340/870.38 |
| 5,469,735 A | 11/1995 | Watanabe ..................... 73/118.1 |
| 5,469,749 A | 11/1995 | Shimada et al. ........... 73/861.47 |
| 5,481,199 A | 1/1996 | Anderson et al. .............. 324/705 |
| 5,481,200 A | 1/1996 | Voegele et al. ................. 324/718 |
| 5,483,387 A | 1/1996 | Bauhahn et al. ............... 359/885 |
| 5,485,753 A | 1/1996 | Burns et al. ..................... 73/720 |
| 5,486,996 A | 1/1996 | Samad et al. ................... 364/152 |
| 5,488,697 A | 1/1996 | Kaemmerer et al. ............ 395/51 |
| 5,489,831 A | 2/1996 | Harris ............................ 318/701 |
| 5,495,769 A | 3/1996 | Broden et al. ................... 73/718 |
| 5,510,779 A | 4/1996 | Maltby et al. ................ 340/870.3 |
| 5,511,004 A | 4/1996 | Dubost et al. ............. 364/551.01 |
| 5,526,293 A | 6/1996 | Mozumder et al. ............ 364/578 |
| 5,539,638 A | 7/1996 | Keeler et al. .............. 364/424.03 |
| 5,548,528 A | 8/1996 | Keeler et al. ................... 364/497 |
| 5,555,190 A | 9/1996 | Derby et al. .................... 364/510 |
| 5,560,246 A | 10/1996 | Bottinger et al. ........... 73/861.15 |
| 5,561,599 A | 10/1996 | Lu ................................. 364/164 |
| 5,570,034 A | 10/1996 | Needham et al. ............. 324/763 |
| 5,570,300 A | 10/1996 | Henry et al. .............. 364/551.01 |
| 5,572,420 A | 11/1996 | Lu ................................. 364/153 |
| 5,573,032 A | 11/1996 | Lenz et al. ..................... 137/486 |

| | | | |
|---|---|---|---|
| 5,578,763 A | 11/1996 | Spencer et al. ............ 73/861.08 |
| 5,591,922 A | 1/1997 | Segeral et al. ............. 73/861.04 |
| 5,598,521 A | 1/1997 | Kilgore et al. ............... 395/326 |
| 5,600,148 A | 2/1997 | Cole et al. ................. 250/495.1 |
| 5,608,650 A | 3/1997 | McClendon et al. ......... 364/510 |
| 5,623,605 A | 4/1997 | Keshav et al. ........... 395/200.17 |
| 5,629,870 A | 5/1997 | Farag et al. ............... 364/551.01 |
| 5,633,809 A | 5/1997 | Wissenbach et al. ......... 364/510 |
| 5,637,802 A | 6/1997 | Frick et al. ...................... 73/724 |
| 5,640,491 A | 6/1997 | Bhat et al. ........................ 395/22 |
| 5,644,240 A | 7/1997 | Brugger ........................ 324/439 |
| 5,654,869 A | 8/1997 | Ohi et al. ...................... 361/540 |
| 5,661,668 A | 8/1997 | Yemini et al. ................ 364/550 |
| 5,665,899 A | 9/1997 | Willcox ......................... 73/1.63 |
| 5,669,713 A | 9/1997 | Schwartz et al. ................. 374/1 |
| 5,671,335 A | 9/1997 | Davis et al. ..................... 395/23 |
| 5,672,247 A | 9/1997 | Pangalos et al. .............. 162/65 |
| 5,675,504 A | 10/1997 | Serodes et al. ............... 364/496 |
| 5,675,724 A | 10/1997 | Beal et al. ................. 395/182.02 |
| 5,680,109 A | 10/1997 | Lowe et al. ................... 340/608 |
| 5,682,317 A | 10/1997 | Keeler et al. ............ 364/431.03 |
| 5,700,090 A | 12/1997 | Eryurek ........................ 374/210 |
| 5,703,575 A | 12/1997 | Kirkpatrick ............ 340/870.17 |
| 5,704,011 A | 12/1997 | Hansen et al. ................... 395/22 |
| 5,705,754 A | 1/1998 | Keita et al. ................. 73/861.357 |
| 5,705,978 A | 1/1998 | Frick et al. ................... 340/511 |
| 5,708,211 A | 1/1998 | Jepson et al. ............. 73/861.04 |
| 5,708,585 A | 1/1998 | Kushion ................ 364/431.061 |
| 5,710,370 A | 1/1998 | Shanahan et al. ............. 73/1.35 |
| 5,710,708 A | 1/1998 | Wiegand ................... 364/470.1 |
| 5,713,668 A | 2/1998 | Lunghofer et al. .......... 374/179 |
| 5,719,378 A | 2/1998 | Jackson, Jr. et al. .......... 219/497 |
| 5,736,649 A | 4/1998 | Kawasaki et al. .......... 73/861.23 |
| 5,741,074 A | 4/1998 | Wang et al. ................... 374/179 |
| 5,742,845 A | 4/1998 | Wagner ........................ 395/831 |
| 5,746,511 A | 5/1998 | Eryurek et al. ..................... 374/2 |
| 5,747,701 A | 5/1998 | Marsh et al. ............... 73/861.23 |
| 5,752,008 A | 5/1998 | Bowling ........................ 395/500 |
| 5,764,539 A | 6/1998 | Rani ............................... 364/557 |
| 5,764,891 A | 6/1998 | Warrior ...................... 395/200.2 |
| 5,781,024 A | 7/1998 | Blomberg et al. ............ 324/763 |
| 5,781,878 A | 7/1998 | Mizoguchi et al. ........... 701/109 |
| 5,790,413 A | 8/1998 | Bartusiak et al. ............ 364/485 |
| 5,801,689 A | 9/1998 | Huntsman .................... 345/329 |
| 5,805,442 A | 9/1998 | Crater et al. .................. 364/138 |
| 5,817,950 A | 10/1998 | Wiklund et al. ............ 73/861.66 |
| 5,825,664 A | 10/1998 | Warrior et al. .................... 700/7 |
| 5,828,567 A | 10/1998 | Eryurek et al. .................. 700/79 |
| 5,829,876 A | 11/1998 | Schwartz et al. .................. 374/1 |
| 5,848,383 A | 12/1998 | Yuuns ............................ 702/102 |
| 5,854,993 A | 12/1998 | Crichnik ......................... 702/54 |
| 5,859,964 A | 1/1999 | Wang et al. ............. 395/185.01 |
| 5,869,772 A | 2/1999 | Storer ......................... 73/861.24 |
| 5,876,122 A | 3/1999 | Eryurek ........................ 374/183 |
| 5,880,376 A | 3/1999 | Sai et al. ................... 73/861.08 |
| 5,887,978 A | 3/1999 | Lunghofer et al. .......... 374/179 |
| 5,908,990 A | 6/1999 | Cummings ................ 73/861.22 |
| 5,923,557 A | 7/1999 | Eidson .................... 364/471.03 |
| 5,924,086 A | 7/1999 | Mathur et al. ................. 706/25 |
| 5,926,778 A | 7/1999 | Pöppel ............................ 702/130 |
| 5,934,371 A | 8/1999 | Bussear et al. .................. 166/53 |
| 5,936,514 A | 8/1999 | Anderson et al. ......... 340/310.01 |
| 5,940,290 A | 8/1999 | Dixon ............................ 364/138 |
| 5,956,663 A | 9/1999 | Eryurek et al. ............... 702/183 |
| 5,970,430 A | 10/1999 | Burns et al. .................. 702/122 |
| 6,002,952 A | 12/1999 | Diab et al. .................... 600/310 |
| 6,004,017 A * | 12/1999 | Madhavan .................... 700/71 |
| 6,014,612 A | 1/2000 | Larson et al. ................. 702/183 |
| 6,014,902 A | 1/2000 | Lewis et al. ................ 73/861.12 |
| 6,016,523 A | 1/2000 | Zimmerman et al. ........... 710/63 |
| 6,016,706 A | 1/2000 | Yamamoto et al. ................. 9/6 |
| 6,017,143 A | 1/2000 | Eryurek et al. .................. 700/51 |
| 6,023,399 A | 2/2000 | Kogure ............................ 361/23 |
| 6,026,352 A | 2/2000 | Burns et al. .................. 702/182 |
| 6,038,579 A | 3/2000 | Sekine .......................... 708/400 |
| 6,045,260 A | 4/2000 | Schwartz et al. ............. 374/183 |
| 6,046,642 A | 4/2000 | Brayton et al. ............... 330/296 |
| 6,047,220 A | 4/2000 | Eryurek et al. .................. 700/28 |
| 6,047,222 A | 4/2000 | Burns et al. .................... 700/79 |
| 6,052,655 A | 4/2000 | Kobayashi et al. ........... 702/184 |
| 6,061,603 A | 5/2000 | Papadopoulos et al. ........ 700/83 |
| 6,072,150 A | 6/2000 | Sheffer ..................... 219/121.83 |
| 6,094,600 A | 7/2000 | Sharpe, Jr. et al. ............. 700/19 |
| 6,112,131 A | 8/2000 | Ghorashi et al. .............. 700/142 |
| 6,119,047 A | 9/2000 | Eryurek et al. .................. 700/28 |
| 6,119,529 A | 9/2000 | Di Marco et al. .......... 73/861.68 |
| 6,139,180 A | 10/2000 | Usher et al. ......................... 374/1 |
| 6,144,924 A * | 11/2000 | Dowling et al. ................ 702/60 |
| 6,151,560 A | 11/2000 | Jones .............................. 702/58 |
| 6,179,964 B1 | 1/2001 | Begemann et al. ........... 162/198 |
| 6,182,501 B1 | 2/2001 | Furuse et al. .................. 73/49.2 |
| 6,192,281 B1 | 2/2001 | Brown et al. .................... 700/2 |
| 6,195,591 B1 | 2/2001 | Nixon et al. ....................... 700/2 |
| 6,199,018 B1 | 3/2001 | Quist et al. ...................... 702/34 |
| 6,209,048 B1 | 3/2001 | Wolff ............................ 710/62 |
| 6,236,948 B1 | 5/2001 | Eck et al. ....................... 702/45 |
| 6,237,424 B1 | 5/2001 | Salmasi et al. ............. 73/861.17 |
| 6,263,487 B1 | 7/2001 | Stripf et al. ....................... 717/1 |
| 6,272,438 B1 | 8/2001 | Cunningham et al. .......... 702/56 |
| 6,289,735 B1 | 9/2001 | Dister et al. ...................... 73/579 |
| 6,298,377 B1 | 10/2001 | Hartikainen et al. ......... 709/223 |
| 6,307,483 B1 | 10/2001 | Westfield et al. ........ 340/870.11 |
| 6,311,136 B1 | 10/2001 | Henry et al. .................... 702/45 |
| 6,317,701 B1 | 11/2001 | Pyostsia et al. ............... 702/189 |
| 6,327,914 B1 | 12/2001 | Dutton ....................... 73/861.356 |
| 6,347,252 B1 | 2/2002 | Behr et al. ......................... 700/2 |
| 6,356,191 B1 | 3/2002 | Kirkpatrick et al. ........... 340/501 |
| 6,360,277 B1 | 3/2002 | Ruckley et al. ................... 9/250 |
| 6,370,448 B1 | 4/2002 | Eryurek et al. ................. 700/282 |
| 6,377,859 B1 | 4/2002 | Brown et al. .................... 700/79 |
| 6,396,426 B1 | 5/2002 | Balard et al. .................. 341/120 |
| 6,397,114 B1 | 5/2002 | Eryurek et al. .................. 700/51 |
| 6,405,099 B1 | 6/2002 | Nagai et al. .................... 700/159 |
| 6,425,038 B1 | 7/2002 | Sprecher ....................... 710/269 |
| 6,434,504 B1 | 8/2002 | Eryurek et al. ............... 702/130 |
| 6,449,574 B1 | 9/2002 | Eryurek et al. .................. 702/99 |
| 6,473,656 B1 | 10/2002 | Langels et al. .................. 700/17 |
| 6,473,710 B1 | 10/2002 | Eryurek ........................ 702/133 |
| 6,480,793 B1 | 11/2002 | Martin ............................ 702/45 |
| 6,492,921 B1 | 12/2002 | Kunitani et al. ............... 341/118 |
| 6,493,689 B2 | 12/2002 | Kotoulas et al. ................. 706/23 |
| 6,505,517 B1 | 1/2003 | Eryurek et al. ............. 73/861.08 |
| 6,519,546 B1 | 2/2003 | Eryurek et al. ............... 702/130 |
| 6,532,392 B1 | 3/2003 | Eryurek et al. .................. 700/54 |
| 6,539,267 B1 | 3/2003 | Eryurek et al. .................. 700/51 |
| 6,546,814 B1 | 4/2003 | Choe et al. ................ 73/862.08 |
| 6,556,145 B1 | 4/2003 | Kirkpatrick et al. ...... 340/870.17 |
| 6,594,603 B1 | 7/2003 | Eryurek et al. ................ 702/104 |
| 6,601,005 B1 | 7/2003 | Eryurek et al. ................ 702/104 |
| 6,611,775 B1 | 8/2003 | Coursolle et al. ................ 702/65 |
| 6,615,149 B1 | 9/2003 | Wehrs ............................. 702/76 |
| 6,654,697 B1 * | 11/2003 | Eryurek et al. .................. 702/47 |
| 6,701,274 B1 | 3/2004 | Eryurek et al. ................ 702/140 |
| 6,758,168 B2 | 7/2004 | Koskinen et al. ................. 122/7 |
| 6,907,383 B2 * | 6/2005 | Eryurek et al. ............... 702/183 |
| 6,915,237 B2 * | 7/2005 | Hashemian ................... 702/183 |
| 7,010,459 B2 * | 3/2006 | Eryurek et al. ............... 702/182 |
| 7,222,049 B2 * | 5/2007 | Schumacher ................ 702/183 |
| 7,254,518 B2 * | 8/2007 | Eryurek et al. ............... 702/183 |
| 2002/0013629 A1 | 1/2002 | Nixon et al. |
| 2002/0029130 A1 | 3/2002 | Eryurek et al. ............... 702/183 |
| 2002/0032544 A1 | 3/2002 | Reid et al. ..................... 702/183 |
| 2002/0077711 A1 | 6/2002 | Nixon ............................. 700/19 |
| 2002/0121910 A1 | 9/2002 | Rome et al. ................... 324/718 |
| 2002/0145568 A1 | 10/2002 | Winter ........................... 343/701 |
| 2002/0148644 A1 | 10/2002 | Schultz et al. .................. 175/39 |
| 2003/0033040 A1 | 2/2003 | Billings ........................... 700/97 |
| 2003/0045962 A1 | 3/2003 | Eryurek et al. |
| 2004/0249583 A1 | 12/2004 | Eryurek et al. .................. 702/47 |
| 2005/0173112 A1* | 8/2005 | Kavaklioglu et al. .... 166/250.01 |
| 2005/0189017 A1* | 9/2005 | Eryurek ...................... 137/487.5 |
| 2007/0163362 A1* | 7/2007 | Wehrs et al. ................ 73/861.42 |

FOREIGN PATENT DOCUMENTS

| | | |
|---|---|---|
| CN | 1196811 | 10/1998 |
| DE | 32 13 866 A1 | 10/1983 |
| DE | 35 40 204 C1 | 9/1986 |
| DE | 40 08 560 A1 | 9/1990 |

| | | |
|---|---|---|
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 199 47 129 | 4/2001 |
| DE | 100 36 971 A1 | 2/2002 |
| DE | 102 23 725 A1 | 4/2003 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 697 586 A2 | 2/1996 |
| EP | 0 749 057 A1 | 12/1996 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1 058 093 A1 | 5/1999 |
| EP | 0 335 957 B1 | 11/1999 |
| EP | 1 022 626 A2 | 7/2000 |
| EP | 1 298 511 | 2/2003 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 317 969 | 4/1998 |
| GB | 2 342 453 A | 4/2000 |
| GB | 2 347 232 A | 8/2000 |
| JP | 56-031573 | 3/1981 |
| JP | 57196619 | 2/1982 |
| JP | 58-129316 | 8/1983 |
| JP | 59-116811 | 7/1984 |
| JP | 59-163520 | 9/1984 |
| JP | 59-176643 | 10/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 62050901 | 3/1987 |
| JP | 62-080535 | 4/1987 |
| JP | 63-169532 | 7/1988 |
| JP | 64-01914 | 1/1989 |
| JP | 64-72699 | 3/1989 |
| JP | 11-87430 | 7/1989 |
| JP | 2-05105 | 1/1990 |
| JP | 3-229124 | 10/1991 |
| JP | 4070906 | 3/1992 |
| JP | 5-122768 | 5/1993 |
| JP | 6095882 | 4/1994 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 08-114638 | 5/1996 |
| JP | 8-136386 | 5/1996 |
| JP | 8-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| WO | WO 94/25933 | 11/1994 |
| WO | WO 95/23361 | 8/1995 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/50851 * | 8/2000 |
| WO | WO 00/55700 | 9/2000 |
| WO | WO 00/70531 | 11/2000 |
| WO | WO 01/01213 A1 | 1/2001 |
| WO | WO 01/19440 | 3/2001 |
| WO | WO 01/77766 | 10/2001 |
| WO | WO 01/90704 A2 | 11/2001 |
| WO | WO 02/27418 | 4/2002 |
| WO | WO 03/081002 | 10/2003 |
| WO | WO 2007/021419 * | 2/2007 |

OTHER PUBLICATIONS

"CompProcessor For Piezoresistive Sensors" MCA Technologies Inc. (MCA7707), pp. 1-8 (publicly available at least as of Apr. 9, 2002).

"Internet Technology Adoption into Automation" by, Fondl et al., Automation Business, pp. 1-5 (publicly available at least as of Apr. 9, 2002).

"Is There a Future For Ethernet in Industrial Control?", Miclot et al., Plant Engineering, Oct. 1988, pp. 44-46, 48, 50.

LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"PC Software Gets Its Edge From Windows, Components, and the Internet", Wayne Labs, I&CS, Mar. 1997, pp. 23-32.

Proceedings Sensor Expo, Aneheim, California, Produced by Expocon Managemnet Associates, Inc., Apr. 1996, pp. 9-21.

"Using Artificial Neural Networks to Identify Nuclear Power Plant States," by Israel E. Alguindigue et al., pp. 1-4 (publicly available at least as of Dec. 23, 1997).

"In Situ Calibration of Nuclear Plant Platinum Resistance Thermometers Using Johnson Noise Methods," *EPRI*, Jun. 1983.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp.1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference* (publicly available at least as of Dec. 23, 1997).

"Fuzzy Logic and Neural Network Applications to Fault Diagnosis", by P. Frank et al., *International Journal of Approximate Reasoning*, (1997), pp. 68-88.
"Keynote Paper: Hardware Compilation—A New Technique for Rapid Prototyping of Digital Systems—Applied to Sensor Validation", by M.P. Henry, *Control Eng. Practice*, vol. 3, No. 7., pp. 907-924, (1995).
"The Implications of Digital Communications on Sensor Validation", by M. Henry et al., *Report No. QUEL 1912/92*, (1992).
"In-Situ Response Time Testing of Thermocouples", *ISA*, by H.M. Hashemian et al., Paper No. 89-0056, pp. 587-593, (1989).
"An Integrated Architecture For Signal Validation in Power Plants," by B.R. Upadhyaya et al., *Third IEEE International Symposium on Intelligent Control*, Aug. 24-26, 1988, pp. 1-6.
"Integration of Multiple Signal Validation Modules for Sensor Monitoring," by B. Upadhyaya et al., *Department of Nuclear Engineering*, Jul. 8, 1990, pp. 1-6.
"Intelligent Behaviour for Self-Validating Sensors", by M.P. Henry, *Advances In Measurement*, pp. 1-7, (May 1990).
"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.
"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.
"Neural Networks for Sensor Validation and Plant Monitoring," by B. Upadhyaya, *International Fast Reactor Safety Meeting*, Aug. 12-16, 1990, pp. 2-10.
"Neural Networks for Sensor Validation and Plantwide Monitoring," by E. Eryurek, 1992.
"A New Method of Johnson Noise Thermometry", by C.J. Borkowski et al., *Rev. Sci. Instrum.*, vol. 45, No. 2, (Feb. 1974) pp. 151-162.
Web Pages from www.triant.com (3 pgs.) (publicly available at least as of Apr. 9, 2002).
"Transient Pressure Signals in Mechanical Heart Valve Caviation," by Z.J. Wu et al., pp. M555-M561 (undated) (publicly available at least as of Apr. 9, 2002).
"Simulatore Integrato: Controllo su bus di campo," by Barabino et al., Automazione e Strumentazione, pp. 85-91 (Oct. 1993).
"Ein Modulares, verteiltes Diagnose-Expertensystem für die Fehlerdiagnose in lokalen Netzen," by Jürgen M. Schröder, pp. 557-565 (1990).
"Fault Diagnosis of Fieldbus Systems," by Jürgen Quade, pp. 577-581 (Oct. 1992).
"Ziele and Anwendungen von Feldbussystemen," by T. Pfeifer et al., pp. 549-557 (Oct. 1987).
"PROFIBUS Infrastructure Measures," by Tilo Pfeifer et al., pp. 416-419 (Aug. 1991).
"Field Bus Networks for Automation Systems Containing Intelligent Functional Unites," by W. Kriesel et al., pp. 486-489 (1987).
"Field Buses for Process Interconnection with Digital Control Systems," Tecnologia, pp. 141-147 (1990).
"Decentralised Systems with Real-Time Field Bus," Netzwerke, Jg. Nr.3 v. 14.3, 4 pages (1990).
Official Action of Russian Application No. 2005141148/09 (045817), filed Dec. 27, 2005 (based on PCT Application No. US 2004/017300, filed Jun. 3, 2004).
First Communication for European patent application 06 787 450.3, mailed Oct. 16, 2008.
Communication for European patent application 02 725 990.2, mailed Jun. 23, 2008.
First Official Action for Russian patent application No. 2008110076, filed Jul. 14, 2006.
First Office Action for Chinese patent application No. 200680029798.6, dated Oct. 30, 2009.
Second Office Action for Chinese patent application No. 200680029798.6 dated Jul. 27, 2010.
Third Office Action from the Chinese patent application No. 200680029798.6 dated Nov. 10, 2010.
U.S. Appl. No. 09/257,896, filed Feb. 25, 1999, Eryurek et al.
U.S. Appl. No. 09/409,098, filed Sep. 30, 1999, Eryurek et al.
U.S. Appl. No. 09/799,824, filed Mar. 5, 2001, Rome et al.
U.S. Appl. No. 09/855,179, filed May 14, 2001, Eryurek et al.
U.S. Appl. No. 09/852,102, filed May 9, 2001, Eryurek et al.
U.S. Appl. No. 09/972,078, filed Oct. 5, 2001, Eryurek et al.
U.S. Appl. No. 10/635,944, filed Aug. 7, 2003, Huisenga et al.
"A TCP/IP Tutorial" by, Socolofsky et al., Spider Systems Limited, Jan. 1991 pp. 1-23.
"Approval Standards for Explosionproof Electrical Equipment General Requirements", Factory Mutual Research, Cl. No. 3615, Mar. 1989, pp. 1-34.
"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor For Piezoresistive Sensors" MCA Technologies Inc. (MCA7707), pp. 1-8, Apr 9, 2002.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.2-1997, Part 3, Aug. 1997, pp. 1-159.
Fieldbus Standard for Use in Industrial Control Systems Part 4: Data Link Protocol Specification, ISA-S50.2-1997, Part 4, Aug. 1997, pp. 1-148.
"Fieldbus Support For Process Analysis" by, Blevins et al., Fisher-Rosemount Systems, Inc., 1995, pp. 121-128.
"Fieldbus Technical Overview Understanding FOUNDATION™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Technology Adoption into Automation" by, Fondl et al., Automation Business, pp. 1-5, Apr. 9, 2002.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future For Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.
"Managing Devices with the Web" by, Howard et al., Byte, Sep. 1997, pp. 45-64.
"PC Software Gets Its Edge From Windows, Components, and the Internet", Wayne Labs, I&Cs, Mar. 1997, pp. 23-32.
Proceedings Sensor Expo, Aneheim, California, Produced by Expocon Managemnet Associates, Inc., Apr. 1996, pp. 9-21.
Proceedings Sensor Expo, Boston, Massachuttes, Produced by Expocon Management Associates, Inc., May 1997, pp. 1-416.
"Smart Sensor Network of the Future" by, Jay Warrior, Sensors, Mar. 1997, pp. 40-45.
"The Embedded Web Site" by, John R. Hines, IEEE Spectrum, Sep. 1996, p. 23.
"Transmission Control Protocol: Darpa Internet Program Protocol Specification" Information Sciences Institute, Sep. 1981, pp. 1-69.
"On-Line Statistical Process Control for a Glass Tank Ingredient Scale," by R.A. Weisman, *IFAC real Time Programming*, 1985, pp. 29-38.
"The Performance of Control Charts for Monitoring Process Variation," by C. Lowry et al., *Commun. Statis.—Simula.*, 1995, pp. 409-437.

"A Knowledge-Based Approach for Detection and Diagnosis of Out-Of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.

"Smart Temperature Measurement in the '90s", by T. Kerlin et al., *C & I*, (1990).

"Software-Based Fault-Tolerant Control Design for Improved Power Plant Operation," *IEEE/IFAC Joint Symposium on Computer-Aided Control System Design*, Mar. 7-9, 1994 pp. 585-590.

A Standard Interface for Self-Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1-4, Dec. 23, 1997.

"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B.R. Upadhyaya et al., *ISA*, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer For Use Up to 1600° C", by M.J. de Groot et al., *Cal Lab*, Jul./Aug. 1996, pp. 38-41.

"Survey, Applications, and Prospects of Johnson Noise Thermometry," by T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I& CS*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I& CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Management System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*, Dec. 23, 1997.

"Fuzzy Logic and Neural Network Applications to Fault Diagnosis", by P. Frank et al., *International Journal of Approximate Reasoning*, (1997), pp. 68-88.

"Keynote Paper: Hardware Compilation—A New Technique for Rapid Prototyping of Digital Systems—Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances In Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," *IBM Technical Disclosure Bulletin*, vol. 20, No. 5, pp. 1954 (Oct. 1977).

"A Self-Validating Thermocouple," Janice C-Y et al., *IEEE Transactions on Control Systems Technology*, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6[Th]. WWW Conference Workshop on Embedded Web Technology, Santa Clara, CA (Apr. 7, 1997).

Microsoft Press Computer Dictionary, 3rd Edition, p. 124. Jan. 1998.

"Internal Statistical Quality Control for Quality Monitoring Instruments", by P. Girling et al., *ISA*, 15 pgs., 1999.

Web Pages from www.triant.com (3 pgs.)_Apr. 9, 2002.

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561, Apr. 9, 2002.

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED—vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA—Vol. 10, pp. 31-36 (1991).

"Developing Predictive Models for Cavitation Erosion," *Codes and Standards in A Global Environment*, PVP—vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jurgen M. Schröder, pp. 557-565 (1990).

"Fault Diagnosis of Fieldbus Systems," by Jürgen Quade, pp. 577-581 (Oct. 1992).

"Ziele and Anwendungen von Feldbussystemen," by T. Pfeifer et al., pp. 549-557 (Oct. 1987).

"PROFIBUS Infrastructure Measures," by Tilo Pfeifer et al., pp. 416-419 (Aug. 1991).

"Simulation the Time Behaviour of Fieldbus Systems," by O. Schnelle, pp. 440-442 (1991).

"Field Bus Networks for Automation Systems Containing Intelligent Functional Unites," by W. Kriesel et al., pp. 486-489 (1987).

"Field Buses for Process Interconnection with Digital Control Systems," Tecnología, pp. 141-147 (1990).

"Decentralised Systems with Real-Time Field Bus," Netzwerke, Jg. Nr.3 v. 14.3, 4 pages (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

International Search Report from Application No. PCT/US01/40791 with international filing of May 22, 2001.

International Search Report from Application No. PCT/US01/40782 with international filing of May 22, 2001.

International Search Report from Application No. PCT/02/14560 with international filing of May 8, 2002.

International Search Report from Application No. PCT/US02/14934 with international filing of May 8, 2002.

"On-Line Tool Condition Monitoring System With Wavelet Fuzzy Neural Network," by Li Xiaoli et al., pp. 271-276 (1997).

"Optimal Design of the Coils of an Electromagnetic Flow Meter," by Michalski, A. et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to a Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

International Search Report from Application No. PCT/US02/06606 with international filing of Mar. 5, 2002.

International Search Report from Application No. PCT/US02/30465 with international filing of Sep. 25, 2002.

"What is a weighted moving average?", *Dau Stat Refresher*, http://cne.gmu.edu/modules/dau/stat/mvavgs/wma_bdy.html. (1995).

U.S. Appl. No. 10/675,014, filed Sep. 2003, Longsdorf et al.

U.S. Appl. No. 10/744,809, filed Dec. 2003, Brown et al.

"Statistics Glossary: Time Series Data", by Easton et al., http://www.stats.gla.ac.uk/steps/glossary/time_series.html, Sep. 1997.

"The Indicators Story", Sustainable Seattle, pp. 55-59, 1998.

"Detecting Regimes in Temperature Time Series", by Clemins et al., *Artificial Neural Networks in Engineering, Proceedings*, pp. 727-732, 2001.

"Re: Digital Filter-Moving Average", The Math Forumn, http://mathforum.org/discuss/sci.math/a/t/177212, Sep. 28, 1998.

U.S. Appl. No. 10/893,144, filed Jul. 2004, Brown et al.

"Notification of Transmittal of the International Search Report and the Written Opinion of the International Searching Authority", or the Declaration for PCT/US2004/017300.

"Invitation to Pay Additional Fees" for PCT/US2004/031678.

"Notification of Transmittal of The International Search Report or the Declaration", PCT/US2004/025291.

"Notification of Transmittal of The International Search Report or the Declaration", PCT/US2004/031678.

"Notification of Transmittal of The International Search Report or the Declaration", PCT/US2005/011385.

"Notification of Transmittal of the International Preliminary Report on Patenatability", PCT/US2004/031678.

"Notification of Transmittal of International Search Report and the Written Opinion", PCT/US2004/022736.

"Notification of Transmittal of the International Search Report", PCT/US00/14798.

Rejection Decision from the Chinese patent application No. 2006-80029798.6 dated Feb. 25, 2011.

\* cited by examiner

PROCESS VARIABLE TRANSMITTER WITH DIAGNOSTICS

This is a Continuation-In-Part of application Ser. No. 10/801,073, now U.S. Pat. No. 7,254,518, filed Mar. 15, 2004 entitled Pressure Transmitter With Diagnostics, which application is a Continuation-In-Part of U.S. application Ser. No. 09/852,102, now U.S. Pat. No. 6,907,383, filed May 9, 2001, which is a Continuation-In-Part of U.S. application Ser. No. 09/257,896, now abandoned, filed Feb. 25, 1999, which is a Continuation-In-Part of U.S. application Ser. No. 08/623,569, filed Mar. 28, 1996, now U.S. Pat. No. 6,017,143; application Ser. No. 09/852,102 now U.S. Pat. No. 6,907,383, is also a Continuation-In-Part of U.S. application Ser. No. 09/383,828, now U.S. Pat. No. 6,654,697, which is a Continuation-In-Part of U.S. application Ser. No. 09/257,896, now abandoned, filed Feb. 25, 1999 which is a Continuation-In-Part of U.S. application Ser. No. 08/623,569, filed Mar. 28, 1996, now U.S. Pat. No. 6,017,143.

BACKGROUND OF THE INVENTION

Process variable transmitters are used in industrial process control environments and couple to the process fluid and provide measurements relative to the process. Process variable transmitters can be configured to monitor one or more process variables associated with fluids in a process plant such as slurries, liquids, vapors and gasses in chemical, pulp, petroleum, gas, pharmaceutical, food and other fluid processing plants. The monitored process variables can be pressure, temperature, flow, level, pH, conductivity, turbidity, density, concentration, chemical composition or other properties of fluids. Process variable transmitter includes one or more sensors that can be either internal to the transmitter or external to the transmitter, depending on the installation needs of the process plant. Process variable transmitters generate one or more transmitter outputs that represent the sensed process variable. Transmitter outputs are configured for transmission over long distances to a controller or indicator via communication buses 242. In typical fluid processing plants, a communication bus 242 can be a 4-20 mA current loop that powers the transmitter, or a fieldbus connection, a HART protocol communication or a fiber optic connection to a controller, a control system or a readout. In transmitters powered by a 2 wire loop, power must be kept low to provide intrinsic safety in explosive atmospheres.

One type of process variable transmitter is known as a pressure transmitter. Typically, a pressure transmitter will be coupled to the process fluid through impulse lines. Pressure transmitter operation can easily deteriorate if one or both of the impulse lines becomes plugged.

Disassembly and inspection of the impulse lines is one method used to detect and correct plugging of lines. Another known method for detecting plugging is to periodically add a "check pulse" to the measurement signal from a pressure transmitter. This check pulse causes a control system connected to the transmitter to disturb the flow. If the pressure transmitter fails to accurately sense the flow disturbance, an alarm signal is generated indicating line plugging. Another known method for detecting plugging is sensing of both static and differential pressures. If there is inadequate correlation between oscillations in the static and differential pressures, then an alarm signal is generated indicating line plugging. Still another known method for detecting line plugging is to sense static pressures and pass them through high pass and low pass filters. Noise signals obtained from the filters are compared to a threshold, and if variance in the noise is less than the threshold, then an alarm signal indicates that the line is blocked.

These known methods use techniques which can increase the complexity and reduce reliability of the devices. Moreover, while these methods can sometimes detect a plugged impulse line, they generally cannot detect when deposits begin to collect within the impulse line, but do not yet plug the impulse line. Thus, operation may continue even though the pressure transmitter's ability to sense pressure has been compromised to some extent. There is thus a need for a better diagnostic technology providing more predictive, less reactive maintenance for reducing cost or improving reliability.

SUMMARY OF THE INVENTION

A process variable transmitter with diagnostics based on power spectral density (PSD) analysis of a process variable sensor signal is provided. In one embodiment, the process variable transmitter is a pressure transmitter and the diagnostics are used to diagnose impulse line obstruction or impending obstruction. Other diagnostics are also useful such as diagnosing primary element degradation. The sensor signal is digitized and the digitized signal is transferred into the frequency domain. The power of the frequencies on the sensor signal is examined to provide the enhanced diagnostics. In one aspect diagnostics are generated directly with the sensor PSD data. In another aspect, the PSD analysis is used to tune a filter in order to enhance traditional diagnostic algorithms.

DETAILED DESCRIPTION OF THE PREFERRED EMBODIMENTS

Embodiments of the present invention generally perform a spectral analysis to generate diagnostic information relative to a process variable transmitter. This analysis is described as occurring within a microprocessor system within the process variable transmitter, but can be performed by any suitable processing system. The processing system 88 can perform a wavelet transformation, discrete wavelet transformation, Fourier transformation, or use other techniques to determine the spectrum of the sensor signal. The power of the distributed frequencies is determined by monitoring such a converted signal over time. One example of this is the power spectral density (PSD). The power spectral density can be defined as the power (or variance) of a time series and can be described as how the power (or variance) of a time series is distributed with frequency. For example, this can be defined as the Fourier transform of an auto-correlation sequence of the time series. Another definition of power spectral density is the squared modulus of the Fourier transform of the time series, scaled by an appropriate constant term.

Figure 1:
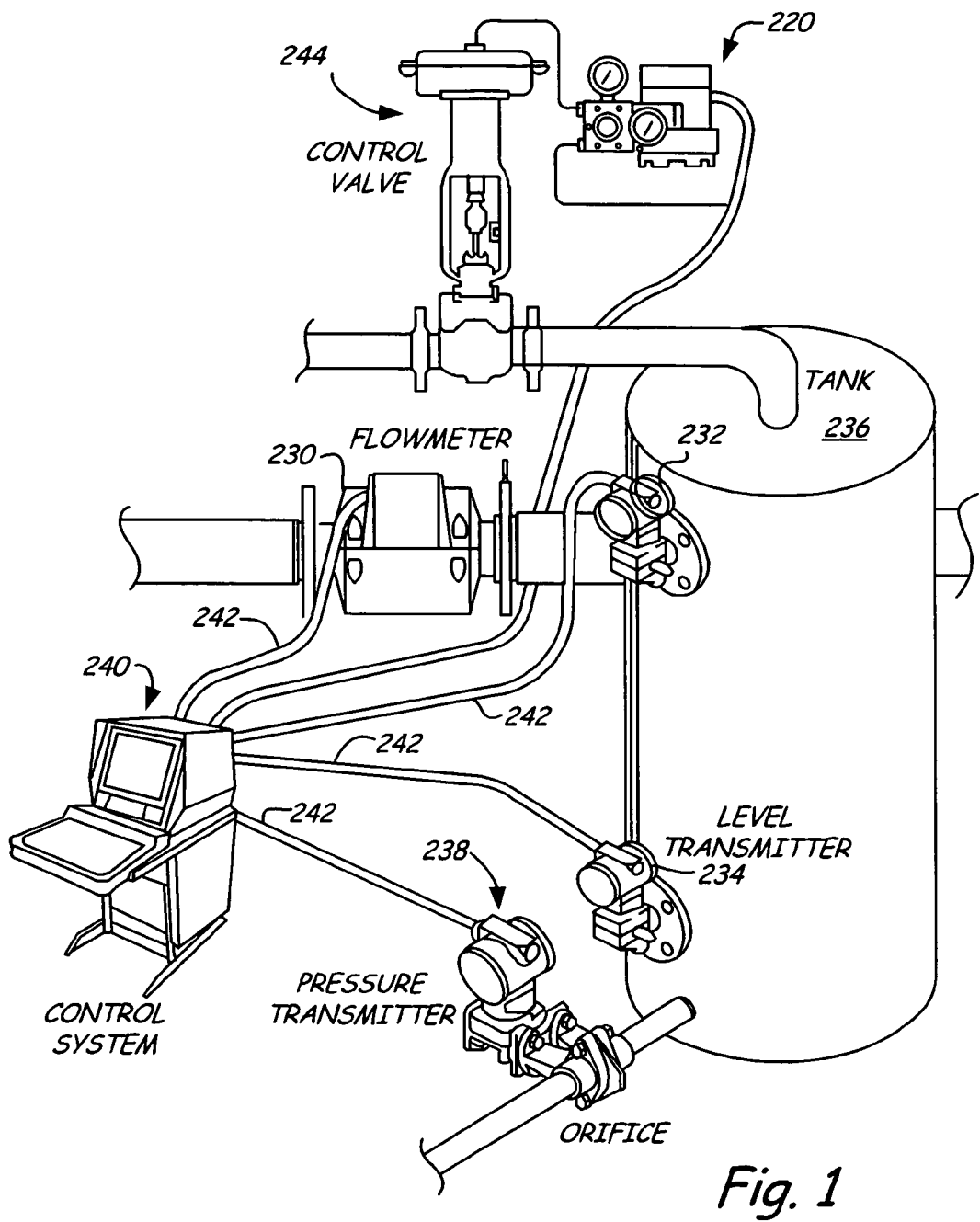
FIG. 1 is an illustration of a typical fluid processing environment for a diagnostic pressure transmitter.

In FIG. 1, a typical environment for diagnostic flow or pressure measurement is illustrated at 220. Process variable transmitters such as flow meter 230, level (pressure) transmitters 232, 234 on tank 236 and integral orifice flow meter 238 are shown connected to control system 240.

In FIG. 1, integral orifice flow meter 238 is provided with a diagnostic output which is also coupled along the communication bus 242 connected to it. Control system 240 can be programmed to display the diagnostic output for a human operator, or can be programmed to alter its operation when there is a diagnostic warning from flow meter 238. Control system 240 controls the operation of output devices such as control valve 244, pump motors or other controlling devices.

Figure 2:
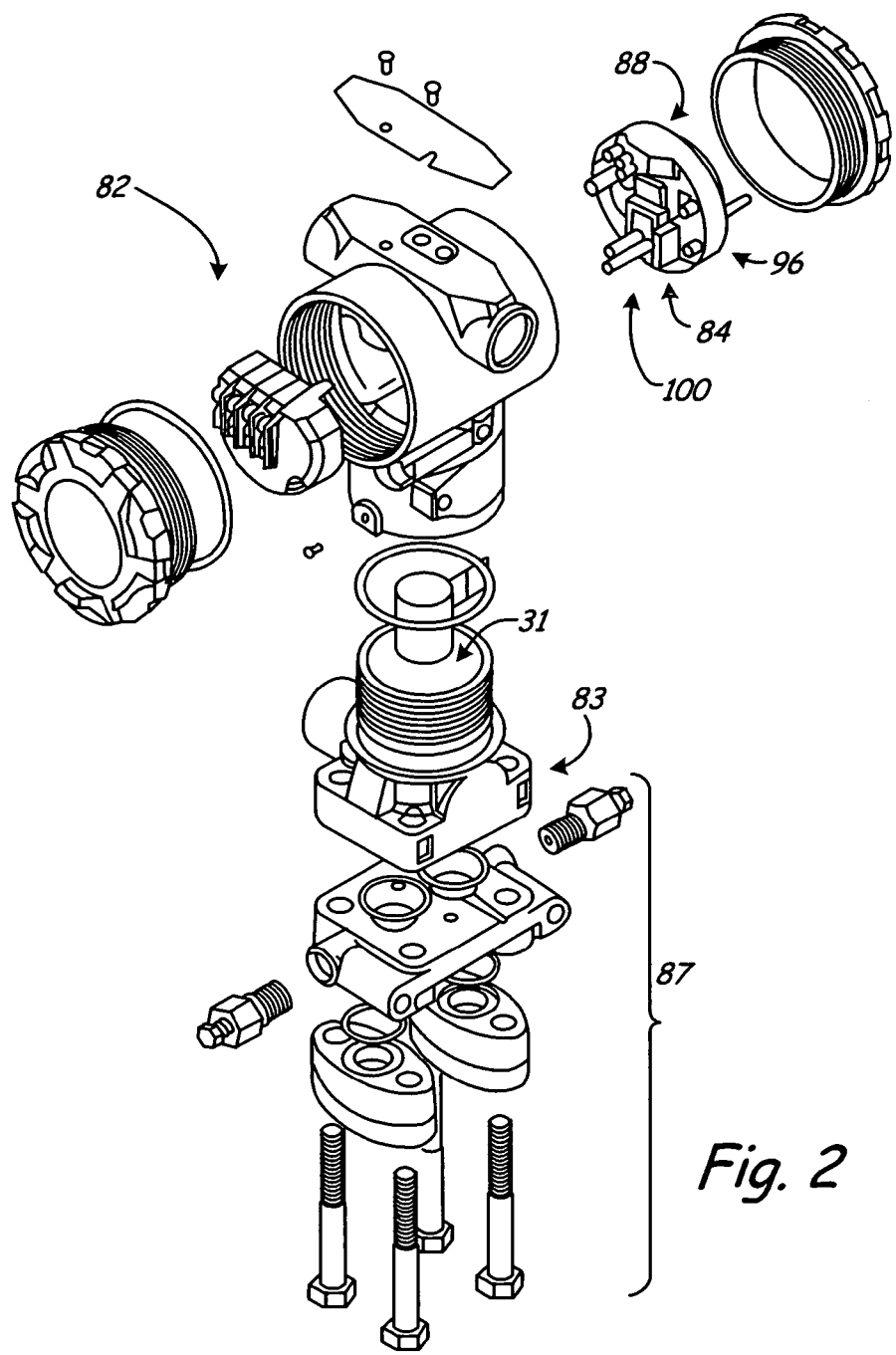
FIG. 2 is a pictorial illustration of an embodiment of a differential pressure transmitter used in a fluid flow meter that diagnoses the condition of its impulse lines and/or primary element.

In FIG. 2, an exploded view of a typical diagnostic transmitter 82 according to the present invention is shown generally. Transmitter 82 includes a flange 83 for receiving a differential pressure, a differential pressure sensor 31, electronics including an analog to digital converter 84, a microprocessor system 88, a digital to analog converter 96, and a digital communications circuit 100. Transmitter 82 is bolted to flange adapter 87. In embodiments shown herein, sensor 31 can comprise an absolute, gage, differential or other type of pressure sensor. Embodiments of the invention are useful in a number of applications, but are particularly advantageous where a process device is coupled to the process through impulse piping. Microprocessor 88 is programmed with diagnostic algorithms, which will be explained in greater detail below. Flange adapter 87 connects to impulse pipes which, in turn, connect to flow around a primary flow element (not shown in FIG. 2). The arrangement of transmitter 82 of FIG. 2 is explained in more detail in FIG. 3.

Figure 3:
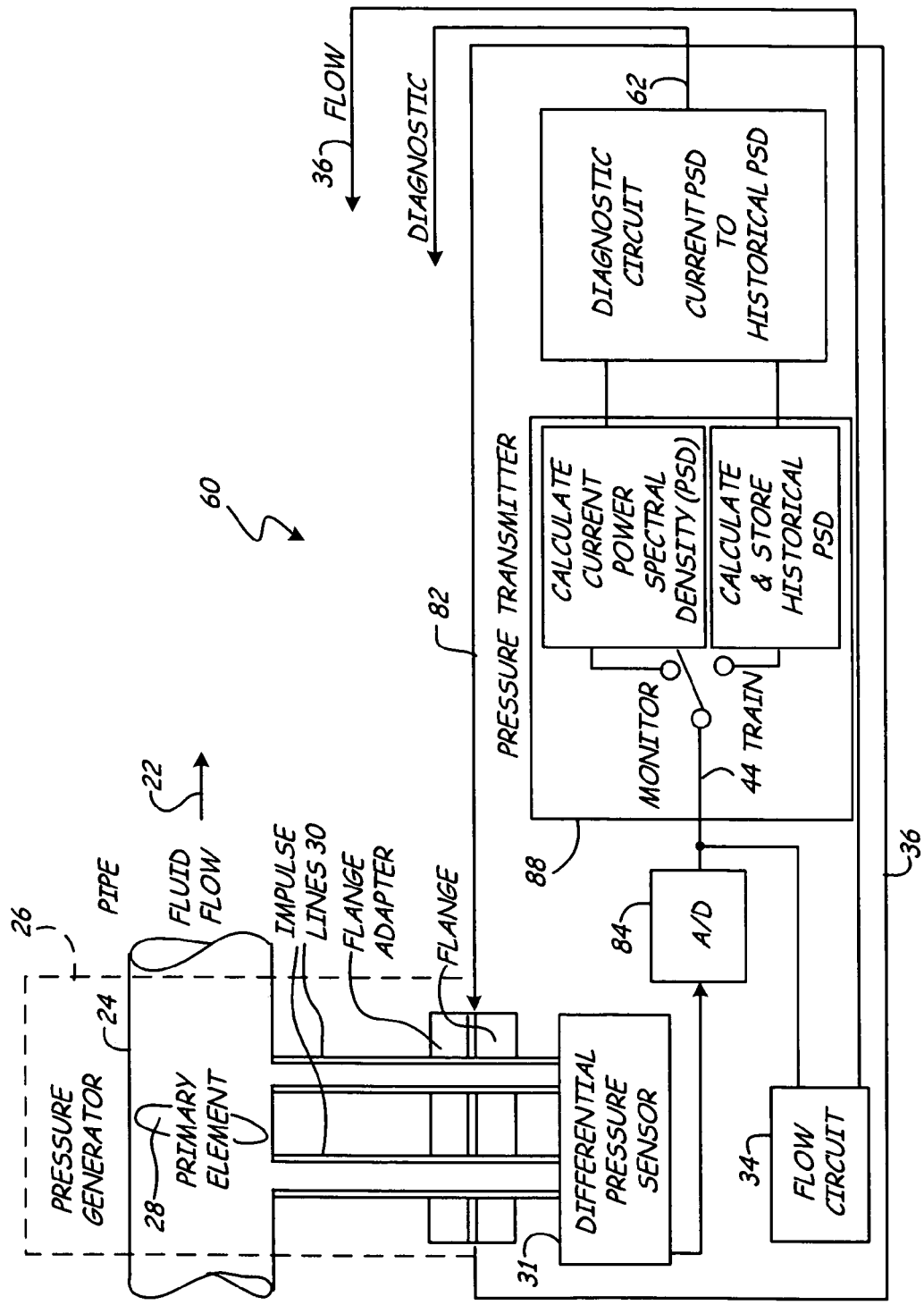
FIG. 3 is a block diagram of a fluid flow meter that provides diagnostics in accordance with embodiments of the present invention.

FIG. 3 is a block diagram showing a fluid flow meter 60 adapted to sense fluid flow 22 in pipe 24. Fluid flow meter 60 includes a pressure generator 26 that includes a primary element 28 and impulse lines 30 that couple pressures generated in the fluid flow around the primary element 28 to a differential pressure sensor 31 in a pressure transmitter 82. The term "pressure generator" as used in this application means a primary element (e.g., an orifice plate, a pitot tube averaging pitot tubing, a nozzle, a venturi, a shedding bar, a bend in a pipe or other flow discontinuity adapted to cause a pressure drop in flow) together with impulse pipes or impulse passageways that couple the pressure drop from locations near the primary element to a location outside the flow pipe. The spectral characteristics of this pressure presented by this defined "pressure generator" at a location outside the flow pipe to a connected pressure transmitter 82 can be affected by the condition of the primary element as well as by the condition of the impulse pipes. The connected pressure transmitter 82 can be a self-contained unit, or it can be fitted with remote seals as needed to fit the application. A flange 83 on the pressure transmitter 82 (or its remote seals) couples to a flange adapter 87 on the impulse lines 30 to complete the pressure connections. Pressure transmitter 82 couples to a primary flow element 28 via impulse lines 30 to sense flow. The pressure transmitter 82 comprises a differential pressure sensor 31 adapted to couple to the impulse lines 30 via a flange arrangement. An analog to digital converter 84 couples to the pressure sensor 31 and generates a series of digital representations of the sensed pressure. These digital representations are used by flow circuit 34 to compute flow and provide an indication of flow along line 36.

In one embodiment of the present invention, analog-to-digital converter is a known Sigma-Delta converter providing 22 conversions per second. In this embodiment, each converted digital representation of the process variable becomes a data point for Power Spectral Density (PSD) analysis. Preferably, a 32 point Fast Fourier Transform (FFT) is applied to the digital process data points to generate PSD information. Since the PSD analysis operates using a known analog-to-digital converter operating in a known manner, this embodiment of the present invention can be implemented wholly in software by adapting the operation of microprocessor system 88. Thus, embodiments of the present invention can be applied to process variable transmitters that are currently installed in the field, or already manufactured, without having to modify their circuitry. Algorithms for performing the PSD analysis are set forth below.

Sigma-Delta converters are often used in the process measurement and control industry due to their fast conversion times and high accuracy. Sigma-Delta converters generally employ an internal capacitor charge pumping scheme that generates a digital bitstream that is analyzed, generally by counting positive 1's over a set interval. For example, one Sigma-Delta converter currently in use provides a bitstream signal consisting of 50% 1's to indicate the minimum pressure measurement, and 75% 1's to indicate the maximum pressure measurement. The digital bitstream is generally filtered to remove or attenuate fluctuating components prior to determination of the flow rate. The filtered data is then used with well-known equations to compute either the mass flow rate or the volumetric flow rate.

In accordance with another embodiment of the present invention, the digital bitstream within the analog-to-digital converter is used directly for PSD analysis. This bitstream usually has a frequency that is many orders of magnitude higher than the conversion frequency. The digital bitstream can have a frequency in excess of about 55 kHz. For example, a known Sigma-Delta converter provides a digital bitstream that has a frequency of approximately 57 kHz. While those skilled in the art will recognize many ways in which PSD analysis can be performed upon the digital bitstream, a preferred method is as follows. For a given interval, such as ten seconds, digital data from the bitstream is collected and saved. In the example above, 10 seconds of 57 kHz data yields 570,000 stored bits. The DC component can be optionally removed from the stored data by subtracting the average bit value (Number of 1's divided by the total number of bits) from each stored bit. Next, power spectral density is computed on the adjusted data. This is preferably done using a 65536 point FFT and a Hanning Window size of 65536. The size of the FFT was chosen because it is the power of 2 closest to the sampling bit frequency, and given a duration of ten seconds, it provides acceptable averaging of the spectrum. However, other sizes may be used in accordance with embodiments of the present invention.

Power spectral density, Fi, can be calculated using Welch's method of averaged periodograms for a given data set. The method uses a measurement sequence $x(n)$ sampled at fs samples per second, where n=1, 2, . . . N. A front end filter with a filter frequency less than fs/2 is used to reduce aliasing in the spectral calculations. The data set is divided into $F_{k,i}$ as shown in Eq. 1:

$$F_{k,i} = (1/M) \left| \sum_{n=1}^{M} x_k(n) e^{-j2\pi i \Delta fn} \right|^2 \quad \text{Eq. 1}$$

There are $F_{k,i}$ overlapping data segments and for each segment, a periodogram is calculated where M is the number of points in the current segment. After all periodograms for all segments are evaluated, all of them are averaged to calculate the power spectrum:

$$Fi = (1/L) \sum_{k=1}^{L} F_{k,i} \quad \text{Eq. 2}$$

Once a power spectrum is obtained for a training mode, this sequence is stored in memory, preferably EEPROM, as the baseline power spectrum for comparison to real time power spectrums. Fi is thus the power spectrum sequence and i goes from 1 to N which is the total number of points in the original data sequence. N, usually a power of 2, also sets the frequency resolution of the spectrum estimation. Therefore, Fi is also known as the signal strength at the $i^{th}$ frequency. The power spectrum typically includes a large number points at predefined frequency intervals, defining a shape of the spectral power distribution as a function of frequency.

Figure 4:
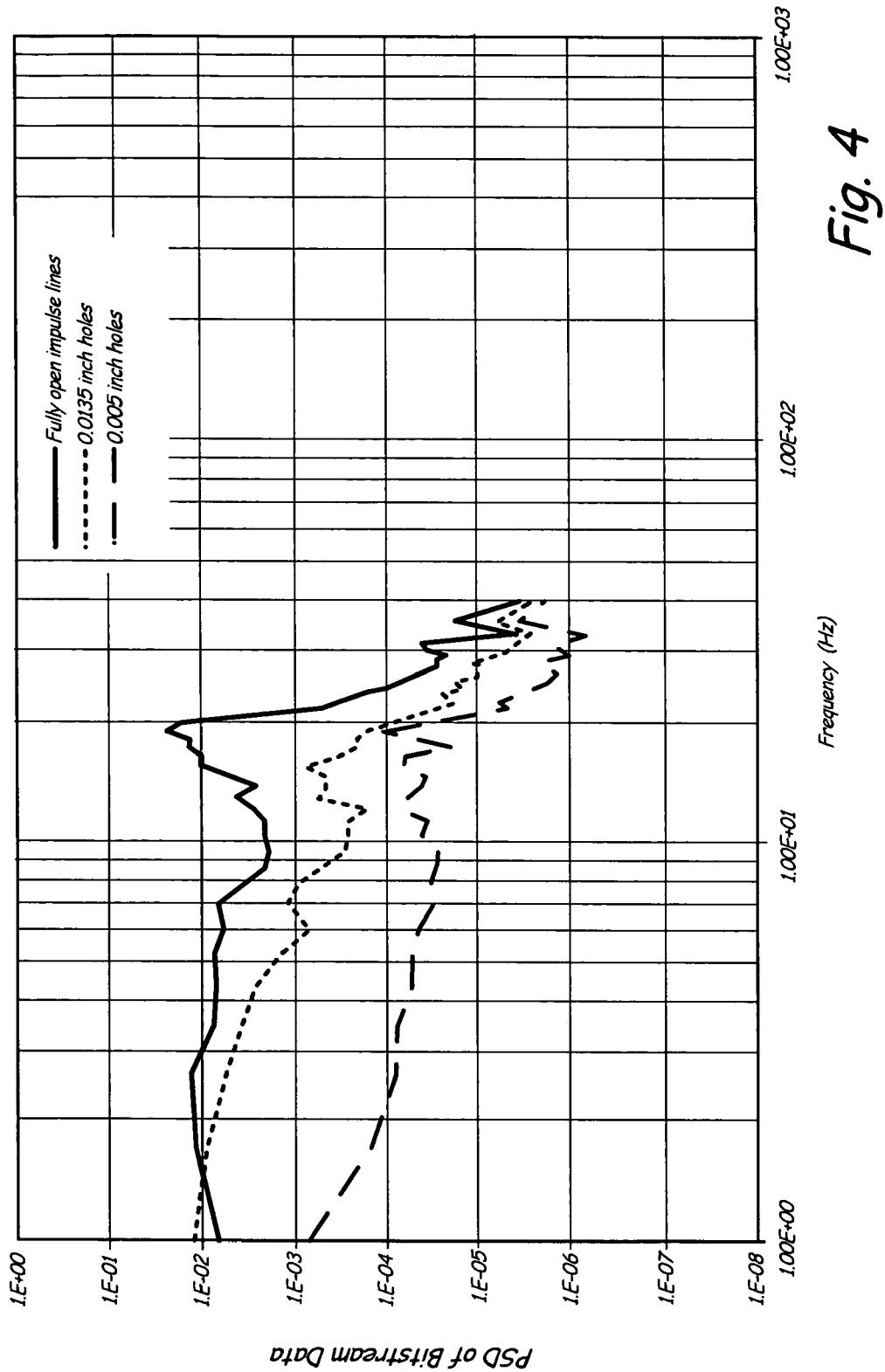
FIGS. 4-6 are graphs illustrating PSD analysis of sensor data being indicative of impulse piping obstruction.
Figure 5:
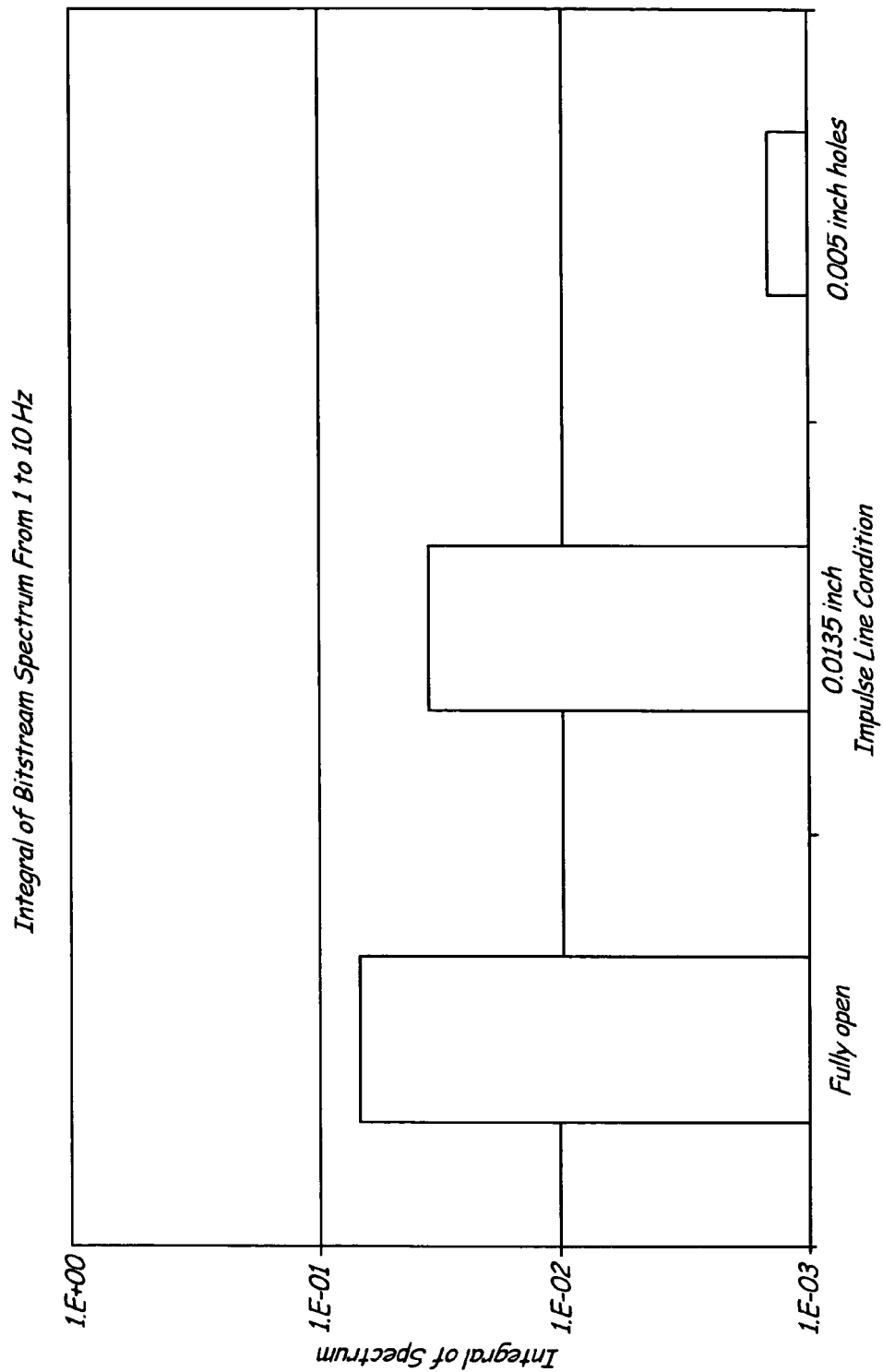
Figure 6:
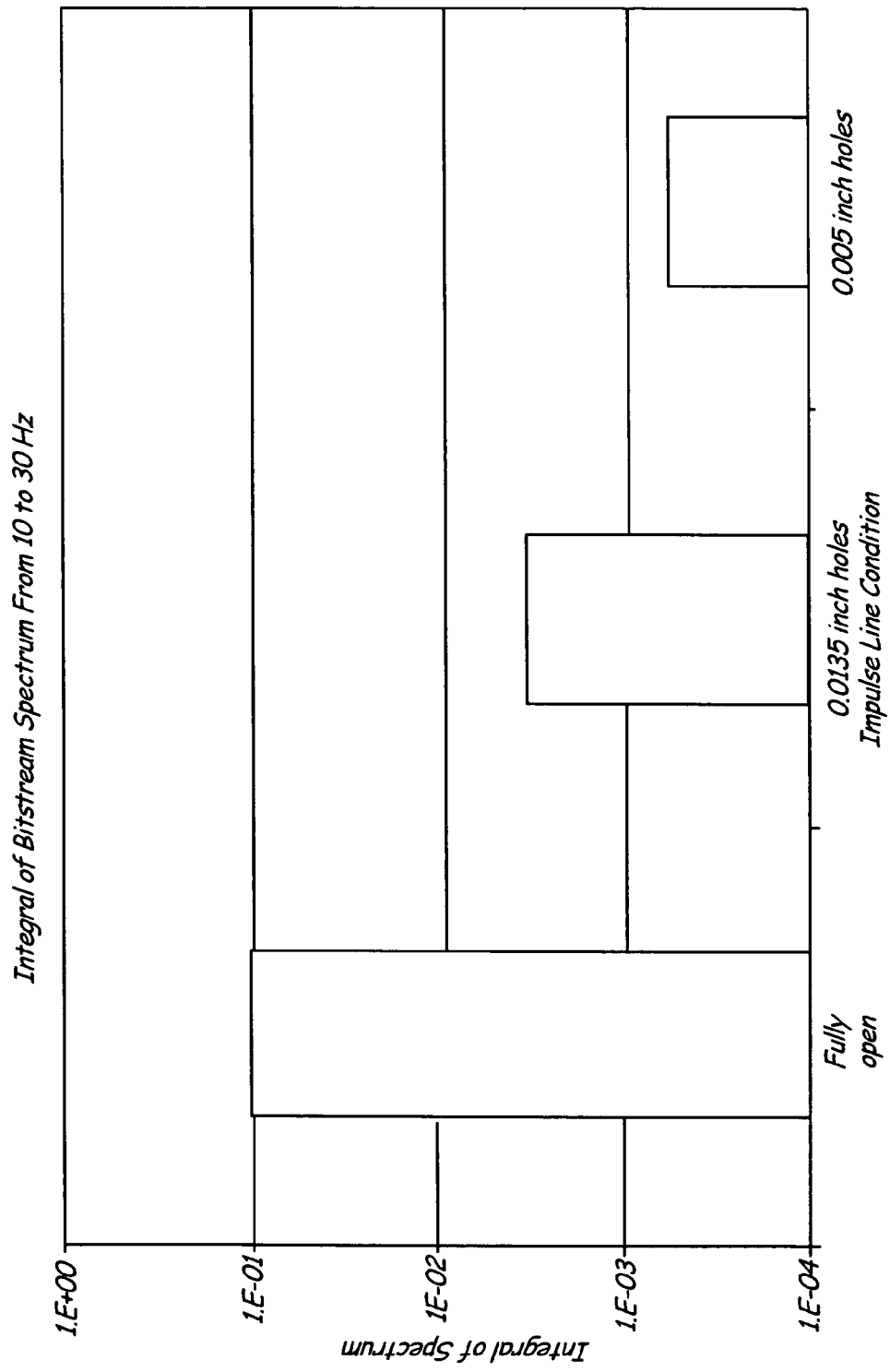

In the performance of diagnostics using power spectral density, a relatively larger sample of the spectral density at baseline historical conditions and a relatively smaller sample of the spectral density at monitoring conditions are compared. The relatively smaller sample allows for a real time indication of problems in about 1 second. An increase in the related frequency components of the power spectrum can indicate the degradation of one or both impulse lines, and/or of the primary element. FIGS. 4-6 illustrate PSD data from a digital bitstream. These figures show three different impulse line conditions: fully open; partially obstructed with 0.0135 inch diameter holes; and substantially obstructed with 0.005 inch holes. As can be seen from FIGS. 5 and 6, integrating the bitstream data from 1 to 10 Hertz, and/or from 10-30 Hertz provides an effective indication of impulse line plugging.

Microprocessor system 88 receives the series of digital representations (either individual digital conversions, or digital bitstream, or any combination thereof. Microprocessor system 88 has an algorithm stored therein that compares PSD data during a monitoring mode with PSD data acquired during a training mode. This comparison allows the process variable transmitter to detect fault that can affect the process variable measurement. This fault can be the plugging of impulse lines in a pressure transmitter, the deterioration of a primary element, or any other factor. System 88 generates diagnostic data 62 as a function of the current data set relative to the historical. A digital to analog converter 96 coupled to the microprocessor system 88 generates an analog transmitter output 98 indicative of the sensed flow rate. A digital communication circuit 100 receives the diagnostic data 94 from the microprocessor system 88 and generates a transmitter output 102 indicating the diagnostic data. The analog output 98 and the diagnostic data 102 can be coupled to indicators or controllers as desired.

Figure 7:
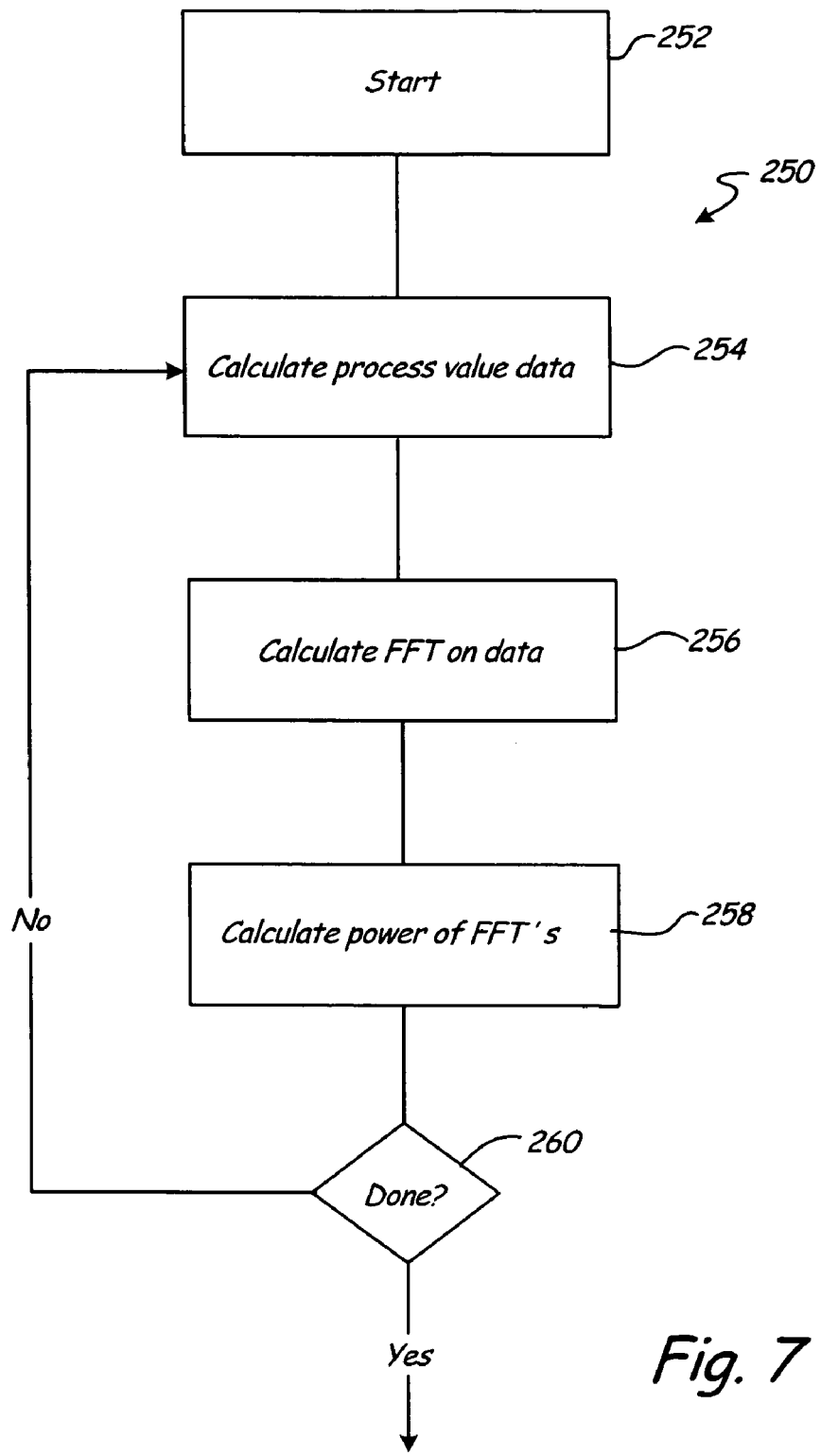
FIG. 7 is a flow chart of a method of training a process variable transmitter for PSD-based diagnostics in accordance with embodiments of the present invention.

FIG. 7 is a flow diagram of a method of training a process variable transmitter for diagnostics in accordance with embodiments of the present invention. Method 250 begins at Start block 252. Block 252 can be executed anytime that there is a relative certainty that the process variable transmitter is fully functional and coupled to a process that is operating within specifications. Usually block 252 will be initiated by a technician, but block 252, in some circumstances, may be initiated remotely. Method 250 continues at block 254 where process value data is received. This data can include a plurality of digital indications. These indications can be individually converted process variable conversions; bits in a bitstream within an analog-to-digital converter; or any combination thereof. At block 256, an FFT is performed on the digital data. This FFT can be done in accordance with any known methods. Moreover, alternate methods for analyzing spectral components of the data can be performed instead of, or in addition to, FFT at block 256. At block 258, the power of the FFT's is calculated. This power information is then stored in the process variable transmitter. At step 260, the method determines if sufficient training has occurred. This can be done by checking whether sufficient time has passed, whether sufficient training data has been acquired, or any other suitable method. If training is not done, method 260 returns to block 254 and training continues. However, if training is determined to be complete at step 260, method 250 will end and the final set of power data Fi will be stored in nonvolatile memory within the process variable transmitter.

Figure 8:
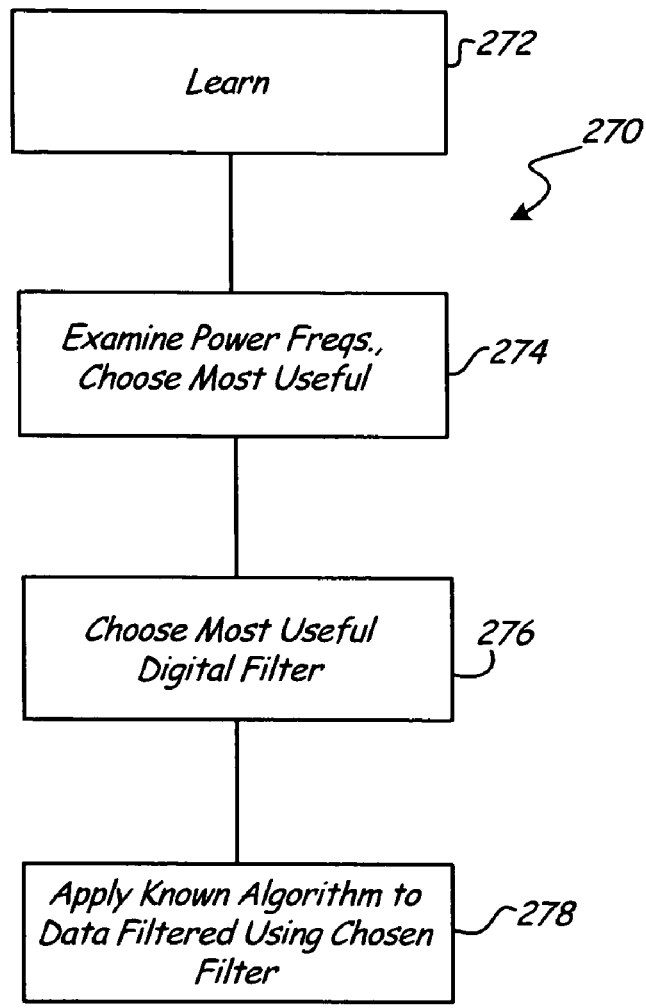
FIG. 8 is a flow chart of a method of selecting digital filter characteristics based upon a PSD analysis in accordance with an embodiment of the present invention.

While many embodiments of the present invention employ PSD analysis of process sensor data for providing diagnostics directly, one embodiment does not. FIG. 8 illustrates a method of selecting digital filter parameters using PSD analysis. Method 270 begins by executing a training method 272, which is preferably identical to method 250. At block 274, the power of the frequencies is examined. At block 276, digital filter frequencies are chosen based upon an analysis of the power spectral density. The choice of frequencies includes selecting which "bins" in the FFT to use. The question is not only which bins to use, but also how many bins to use. This choice can be as simple as selecting one bin, or more complex. For example, non-adjoining bins could be selected; adjoining bins could be selected; all bins that contribute to the whole could be selected and weighed based on their respective magnitudes; or any combination thereof. Choosing bins can be done using a number of criteria. For example, the bin(s) with the most power could be selected; the bin(s) with the most variance in power could be selected; the bin(s) with the least variance in power could be selected; the bin(s) with the least magnitude could be selected; the bin(s) with the highest standard deviation could be selected; the bin(s) with the lowest standard deviation could be selected; or a group of adjacent bins with similar magnitudes could be selected. Once the bins are selected, the corresponding filter characteristics are used to digitally filter the sensor data, as indicated at block 278. The so filtered data can then be used for more effective process measurement and/or diagnostics. Thus, the filter characteristics can be chosen dynamically based upon PSD analysis of the sensor data. The filtered data could even be used with known statistical line plugging algorithms and techniques in accordance with embodiments of the present invention.

Figure 9:
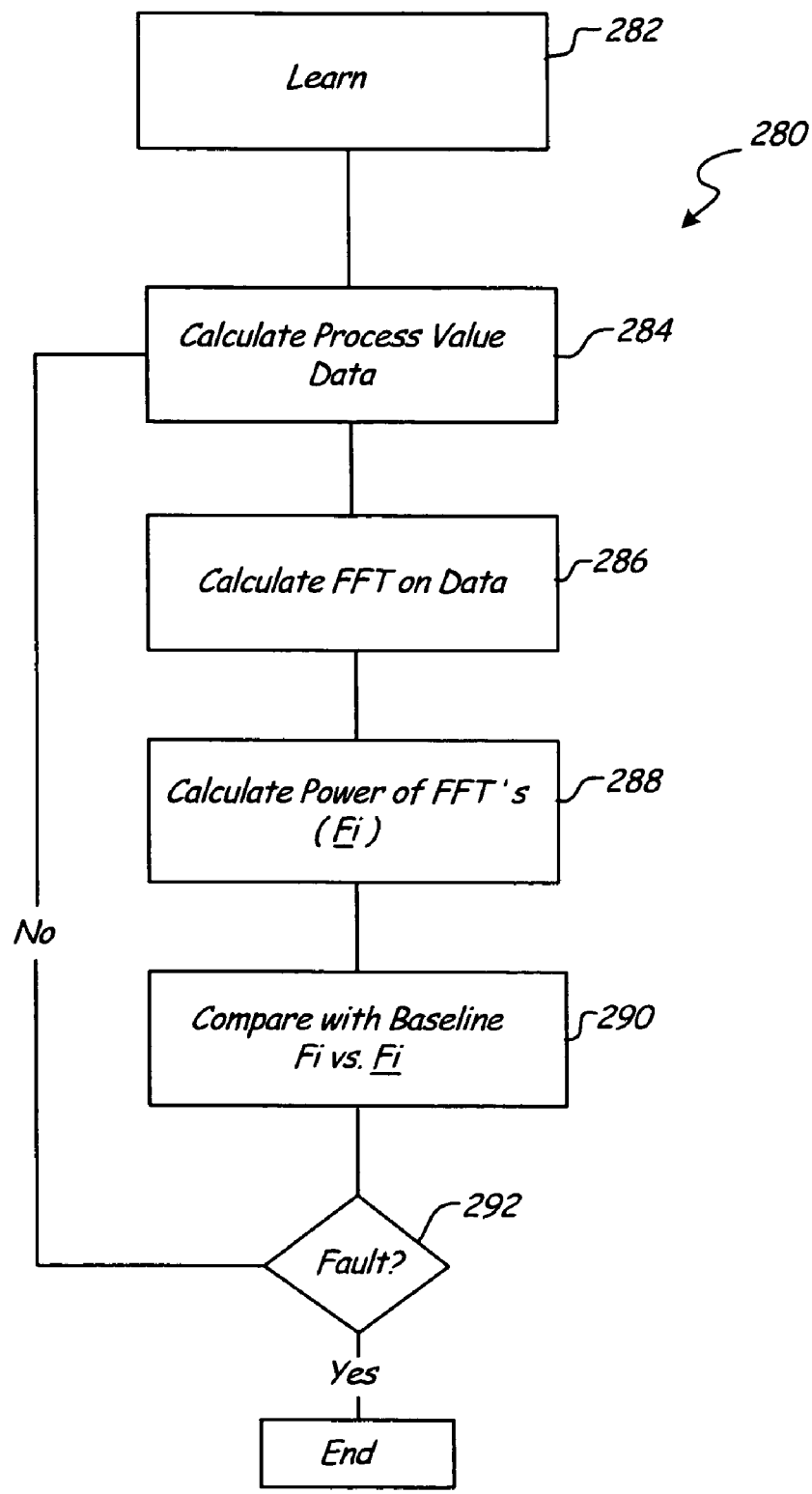
FIG. 9 is a flow chart of a method of performing PSD-based diagnostics in accordance with embodiments of the present invention.

FIG. 9 is a flow chart of a method of performing PSD-based diagnostics in accordance with embodiments of the present invention. Many factors can affect the digital bitstream and thus the process variable. The impulse lines can become clogged and/or the primary element can become eroded or fouled. Method 280 begins at block 282, where training occurs. Block 282 is preferably identical to training method 250 described with respect to FIG. 7. Once training has completed, method 280 moves to block 284 where the process value data is calculated. Again, this data can be a set of individual analog-to-digital converted readings from converter 84, or the data include all or part of a digital bitstream generated within converter 84. At block 286, the data is converted into the frequency domain, preferably using FFT. At block 288, the power of the FFT's is calculated yielding a set Fi of power spectral data related to the process variable. At block 290, the set Fi is compared to the stored training data set Fi. This comparison can take many forms. For example, the comparison can include examining the sum of the magnitudes for selected spectral ranges. The comparison can also include comparing the standard deviation and mean of Fi compared to the standard deviation and mean of Fi. Yet another comparison includes comparing frequency ranges that are consistently of a higher or lower magnitude. Yet another comparison includes comparing the deviation of a sum of the magnitudes over the selected frequencies. Referring back to FIG. 6, using digital bitstream data, the "fully open" condition would correspond to the training set Fi. Thus, comparing the integral of the bitstream spectrum from a selected frequency range can show that when the impulse lines are beginning to clog, the integral of the spectrum drops substantially. One frequency range that has worked well in testing is between 10 and 40 Hz. However, a range between 10 and 30 Hz is also believed to be beneficial. Finally, there appears to be useful information provided in the 30-40 Hz range that may also be useful for detecting partial, or full, impulse line plugging. The difference between Fi and Fi as indicated by the integral of a selected spectrum can be compared to a preselected threshold to determine if a fault exists. At block 292, fault determination is performed based upon the comparison(s) in block 290. If a fault is revealed, control passes to block 294 where the fault is indicated, and process variable transmitter operation can be optionally halted. This fault indication can be a local indication such as a device alarm, or an indication communicated to a remote entity such as a control room or operator. The fault indication may indicate a current critical fault, or it may indicate an impending fault. If no fault is found, control returns to block 284 and the method continues to monitor the process device operation.

Any of the methods can be stored on a computer-readable medium as a plurality of sequences of instructions, the plurality of sequences of instructions including sequences that, when executed by a microprocessor system in a pressure transmitter cause the pressure transmitter to perform a diagnostic method relative to a primary element and impulse lines couplable to the transmitter.

In one embodiment, microprocessor system 88 includes signal preprocessor which is coupled to sensor 31 through analog to digital converter 84 which isolates signal components in the sensor signal such as frequencies, amplitudes or signal characteristics which are related to a plugged impulse line 30 or degraded primary element 28. The signal preprocessor provides an isolated signal output to a signal evaluator in microprocessor 88. The signal preprocessor isolates a portion of the signal by filtering, performing a wavelet transform, performing a Fourier transform, use of a neural network, statistical analysis, or other signal evaluation techniques. Such preprocessing is preferably implemented in microprocessor 88 or in a specialized digital signal processor. The isolated signal output is related to a plugged or plugging impulse line 30 or degraded primary element 28 sensed by sensor 31.

Figure 10:
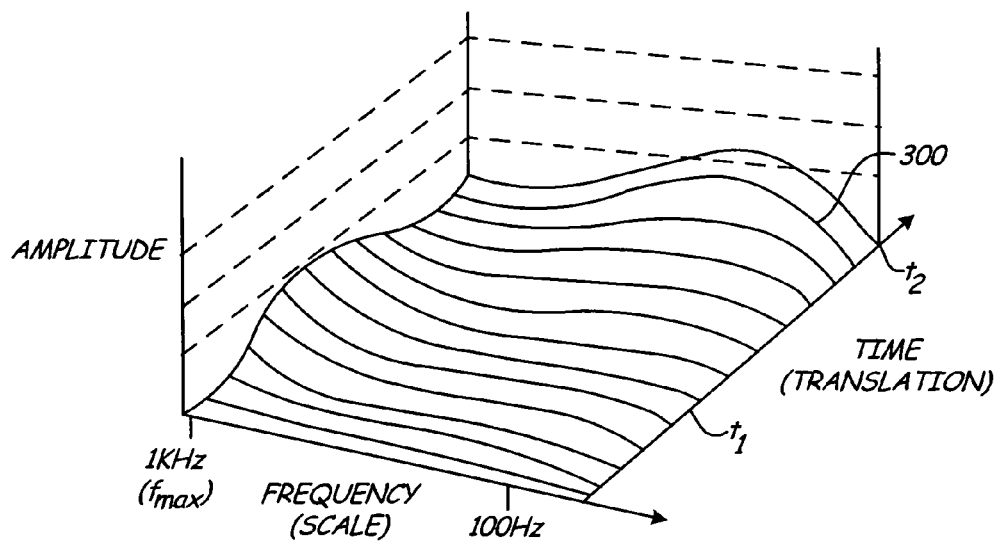
FIG. 10 is a graph of amplitude versus frequency versus time of a process variable signal.
Figure 11:
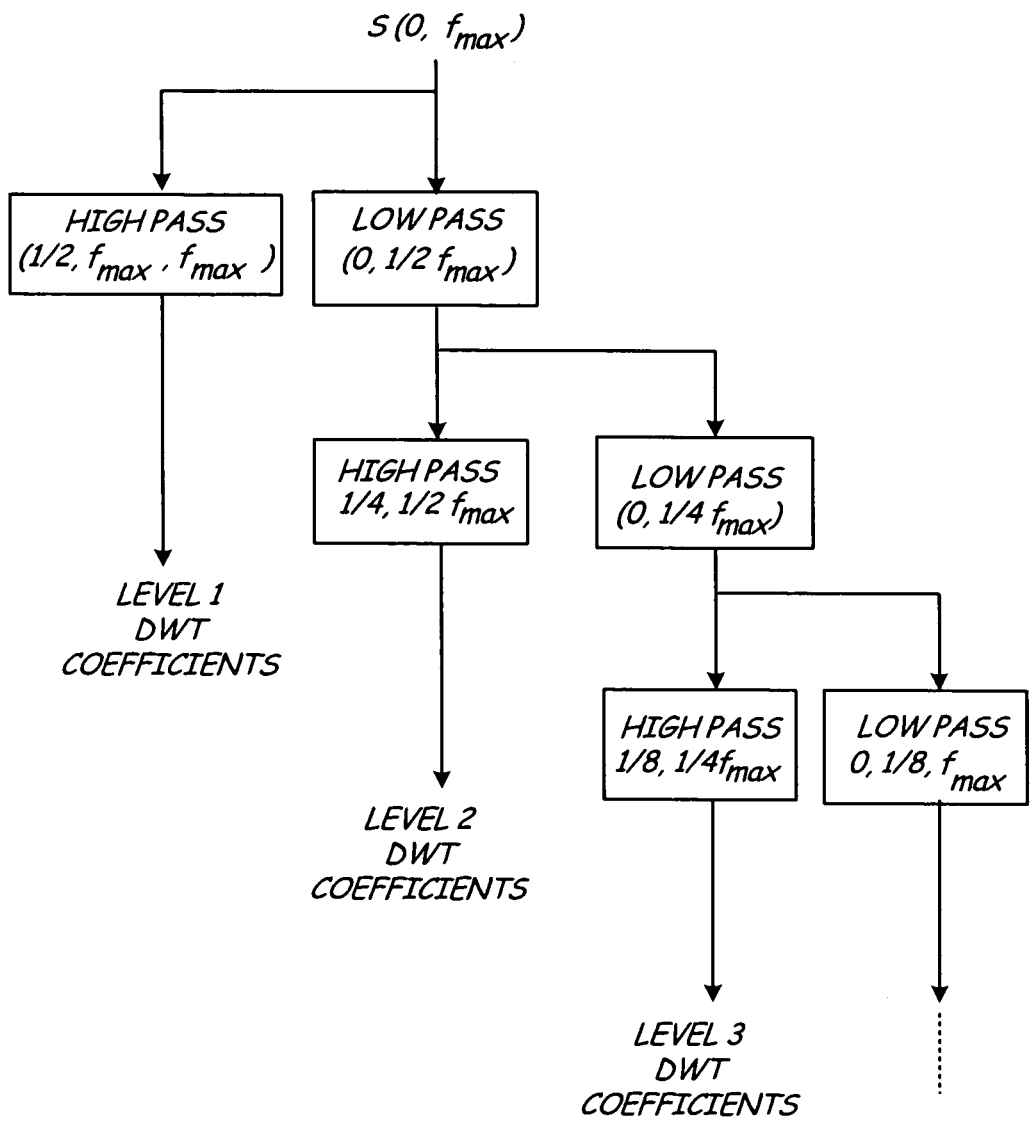
FIG. 11 is a block diagram of a discrete wavelet transformation.
Figure 12:
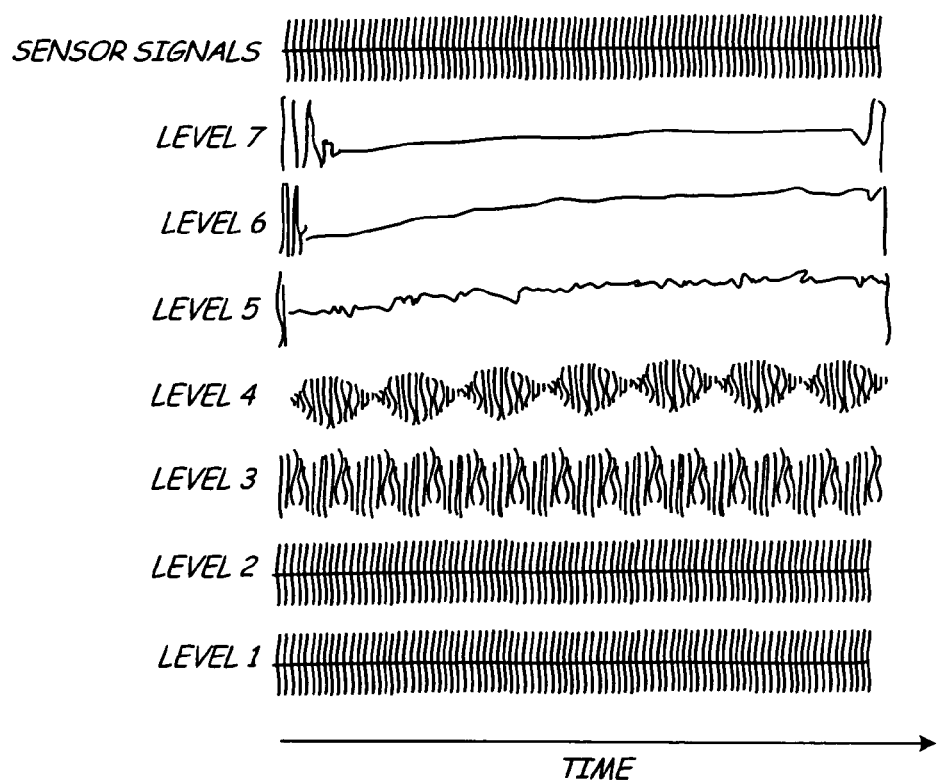
FIG. 12 is a graph showing signals output from a discrete wavelet transformation.

The signal components are isolated through signal processing techniques in which only desired frequencies or other signal characteristics such as amplitude are identified and an indication of their identification is provided. Depending upon the strength signals to be detected and their frequency, signal preprocessor can comprise a filter, for example a band pass filter, to generate the isolated signal output. For more sensitive isolation, advanced signal processing techniques are utilized such as a Fast Fourier transform (FFT) to obtain the spectrum of the sensor signal. In one embodiment, the signal preprocessor comprises a wavelet processor which performs a wavelet analysis on the sensor signal as shown in FIGS. 10, 11 and 12 using a discrete wavelet transform. Wavelet analysis is well suited for analyzing signals which have transients or other non-stationary characteristics in the time domain. In contrast to Fourier transforms, wavelet analysis retains information in the time domain, i.e., when the event occurred.

Wavelet analysis is a technique for transforming a time domain signal into the frequency domain which, like a Fourier transformation, allows the frequency components to be identified. However, unlike a Fourier transformation, in a wavelet transformation the output includes information related to time. This may be expressed in the form of a three dimensional graph with time shown on one axis, frequency on a second axis and signal amplitude on a third axis. A discussion of wavelet analysis is given in *On-Line Tool Condition Monitoring System With Wavelet Fuzzy Neural Network*, by L. Xiaoli et al., 8 JOURNAL OF INTELLIGENT MANUFACTURING pgs. 271-276 (1997). In performing a continuous wavelet transformation, a portion of the sensor signal is windowed and convolved with a wavelet function. This convolution is performed by superimposing the wavelet function at the beginning of a sample, multiplying the wavelet function with the signal and then integrating the result over the sample period. The result of the integration is scaled and provides the first value for continuous wavelet transform at time equals zero. This point may be then mapped onto a three dimensional plane. The wavelet function is then shifted right (forward in time) and the multiplication and integration steps are repeated to obtain another set of data points which are mapped onto the 3-D space. This process is repeated and the wavelet is moved (convolved) through the entire signal. The wavelet function is then scaled, which changes the frequency resolution of the transformation, and the above steps are repeated.

Data from a wavelet transformation of a sensor signal from sensor 31 is shown in FIG. 10. The data is graphed in three dimensions and forms a surface 300. As shown in the graph of FIG. 10, the sensor signal includes a small signal peak at about 1 kHz at time $t_1$ and another peak at about 100 Hz at time $t_2$. Through subsequent processing by the signal evaluator, surface 300 or portions of surface 300 are evaluated to determine impulse piping or primary element degradation.

The continuous wavelet transformation described above requires extensive computations. Therefore, in one embodiment, microprocessor system 88 performs a discrete wavelet transform (DWT) which is well suited for implementation in microprocessor system. One efficient discrete wavelet transform uses the Mallat algorithm, which is a two channel sub-band coder. The Mallat algorithm provides a series of separated or decomposed signals which are representative of individual frequency components of the original signal. FIG. 11 shows an example of such a system in which an original sensor signal S is decomposed using a sub-band coder of a Mallat algorithm. The signal S has a frequency range from 0 to a maximum of $f_{MAX}$. The signal is passed simultaneously through a first high pass filter having a frequency range from ½ $f_{MAX}$ to $f_{MAX}$, and a low pass filter having a frequency range from 0 to ½ $f_{MAX}$. This process is called decomposition. The output from the high pass filter provides "level 1" discrete wavelet transform coefficients. The level 1 coefficients represent the amplitude as a function of time of that portion of the input signal which is between ½ $f_{max}$ and $f_{MAX}$. The output from the 0-½ $f_{max}$ low pass filter is passed through subsequent high pass (¼ $f_{max}$–½ $f_{max}$) and low pass (0–¼ $f_{max}$) filters, as desired, to provide additional levels (beyond "level 1") of discrete wavelet transform coefficients. The outputs from each low pass filter can be subjected to further decompositions offering additional levels of discrete wavelet transformation coefficients as desired. This process continues until the desired resolution is achieved or the number of remaining data samples after a decomposition yields no additional information. The resolution of the wavelet transform is chosen to be approximately the same as the sensor or the same as the minimum signal resolution required to monitor the signal. Each level of DWT coefficients is representative of signal amplitude as a function of time for a given frequency range. Coefficients for each frequency range are concatenated to form a graph such as that shown in FIG. 10.

In some embodiments, padding is added to the signal by adding data to the sensor signal near the borders of windows used in the wavelet analysis. This padding reduces distortions in the frequency domain output. This technique can be used with a continuous wavelet transform or a discrete wavelet transform. "Padding" is defined as appending extra data on either side of the current active data window, for example, extra data points are added which extend 25% of the current window beyond either window edge. In one embodiment, the padding is generated by repeating a portion of the data in the current window so that the added data "pads" the existing signal on either side. The entire data set is then fit to a quadratic equation which is used to extrapolate the signal 25% beyond the active data window.

FIG. 12 is an example showing a signal S generated by sensor 31 and the resultant approximation signals yielded in seven decomposition levels labeled level 1 through level 7. In this example, signal level 7 is representative of the lowest frequency DWT coefficient which can be generated. Any further decomposition yields noise. All levels, or only those levels which relate impulse piping or primary element degradation are provided.

Microprocessor 88 evaluates the isolated signal received from the signal preprocessing and in one embodiment, monitors an amplitude of a certain frequency or range of frequencies identified and provides a diagnostic output if a threshold is exceeded. Signal evaluator can also comprise more advanced decision making algorithms such as fuzzy logic, neural networks, expert systems, rule based systems, etc. Commonly assigned U.S. Pat. No. 6,017,143 describes various decision making systems which can be implemented in signal evaluator 154 and is incorporated herein by reference.

Microprocessor 88 performs diagnostics related to the impulse piping or primary element using information derived from the differential pressure sensor 31. The following describes a number of embodiments for realizing a diagnostic circuit. The diagnostic circuit can provide a residual lifetime estimate, an indication of a failure, an indication of an impending failure or a calibration output which is used to correct for errors in the sensed process variable.

Although the present invention has been described with reference to preferred embodiments, workers skilled in the art will recognize that changes can be made in form and detail without departing from the spirit and scope of the invention. For example, various function blocks of the invention have been described in terms of circuitry, however, many function blocks may be implemented in other forms such as digital and analog circuits, software and their hybrids. When implemented in software, a microprocessor performs the functions and the signals comprise digital values on which the software operates. A general purpose processor programmed with instructions that cause the processor to perform the desired process elements, application specific hardware components that contain circuit wired to perform the desired elements and any combination of programming a general purpose processor and hardware components can be used. Deterministic or fuzzy logic techniques can be used as needed to make decisions in the circuitry or software. Because of the nature of complex digital circuitry, circuit elements may not be partitioned into separate blocks as shown, but components used for various functional blocks can be intermingled and shared. Likewise with software, some instructions can be shared as part of several functions and be intermingled with unrelated instructions within the scope of the invention. The diagnostic output can be a predictive indicator of a future failure, such as the future partial or complete plugging of an impulse line. The diagnostics can be applied to impulse piping and/or primary elements. Finally, although various embodiments of the present invention have been described with respect to a pressure transmitter, embodiments of the present invention can be practiced with any process device where a sensor is coupled to the process device through an analog-to-digital converter.

What is claimed is:

1. A process variable transmitter for coupling to a process and providing an indication of a variable of the process over a communication bus, the process variable transmitter comprising:
    a process variable sensor coupleable to the process to provide an analog indication of the variable;
    an analog-to-digital converter coupled to the process variable sensor and providing digital information indicative of the analog indication provided by the sensor and providing digital bitstream information;
    output circuitry configured to provide an output related to the process variable;
    a microprocessor system coupled to the analog-to-digital converter and configured to calculate power spectral density of the digital bitstream information using a Hanning window size of 65536 samples and responsively generate diagnostic information based on the power spectral density;
    wherein the digital information includes the digital bitstream information data having a frequency in excess of about 55 kHz; and
    wherein the digital bitstream information is transferred to the frequency domain using a Fast Fourier Transform (FFT).

2. The transmitter of claim 1, wherein the diagnostic information is based on an integral of a spectrum ranging from about 1 to about 10 Hz.

3. The transmitter of claim 1, wherein the diagnostic information is based on an integral of a spectrum ranging from about 10 to about 30 Hz.

4. The transmitter of claim 1, wherein the diagnostic information is based on an integral of a spectrum ranging from about 10 to about 40 Hz.

5. The transmitter of claim 1, wherein the diagnostic information is based on an integral of a spectrum ranging from about 30 to about 40 Hz.

6. The transmitter of claim 1, wherein the Fast Fourier Transform has a size within a power of 2 of the frequency.

* * * * *